(12) United States Patent
Santamato et al.

(10) Patent No.: US 11,898,937 B2
(45) Date of Patent: Feb. 13, 2024

(54) SEMIAUTOMATIC APPARATUS FOR CONDITION-BASED MAINTENANCE OF RAILWAY PANTOGRAPH

(71) Applicants: SCUOLA SUPERIORE SANT'ANNA, Pisa (IT); TRENITALIA SPA, Rome (IT)

(72) Inventors: Giancarlo Santamato, Pisa (IT); Massimiliano Solazzi, Pisa (IT); Antonio Frisoli, Pisa (IT); Paolo Masini, Pisa (IT); Mauro Menci, Pisa (IT)

(73) Assignees: Scuola Superiore Sant'anna, Pisa (IT); Trenitalia SpA, Rome (IT)

( * ) Notice: Subject to any disclaimer, the term of this patent is extended or adjusted under 35 U.S.C. 154(b) by 435 days.

(21) Appl. No.: 17/296,092

(22) PCT Filed: Nov. 23, 2019

(86) PCT No.: PCT/IB2019/060096
§ 371 (c)(1),
(2) Date: May 21, 2021

(87) PCT Pub. No.: WO2020/105018
PCT Pub. Date: May 28, 2020

(65) Prior Publication Data
US 2022/0011196 A1    Jan. 13, 2022

(30) Foreign Application Priority Data

Nov. 23, 2018    (IT) .................. 102018000010541

(51) Int. Cl.
*G01M 17/08* (2006.01)
*B60L 13/10* (2006.01)

(52) U.S. Cl.
CPC ............. *G01M 17/08* (2013.01); *B60L 13/10* (2013.01)

(58) Field of Classification Search
CPC ...................................................... G01M 17/08
See application file for complete search history.

(56) References Cited

U.S. PATENT DOCUMENTS

2018/0208222 A1    7/2018    Zhang et al.

FOREIGN PATENT DOCUMENTS

| CN | 2316662 | 4/1999 |
|---|---|---|
| CN | 201803855 | 4/2011 |
| CN | 204462777 | 7/2015 |
| CN | 104897423 | 9/2015 |
| CN | 204788991 | 11/2015 |

(Continued)

OTHER PUBLICATIONS

International Search Report dated Mar. 4, 2020.
(Continued)

*Primary Examiner* — Alan D Hutchinson
(74) *Attorney, Agent, or Firm* — Preston Smirman; SMIRMAN IP LAW, PLLC

(57) ABSTRACT

A semiautomatic (1) sensorized apparatus for the execution of inspections of the railway pantograph (P) is detachably associated to a railway pantograph and allows the execution of two distinct tests in succession: i) the first one, which monitors the functional properties of the pantograph, based on the characterization of the thrust force generated by the main suspension; ii) the second, which aims to identify global and local defects, adopting the principle of inspection by means of vibration analysis.

14 Claims, 16 Drawing Sheets

(56) References Cited

FOREIGN PATENT DOCUMENTS

| | | |
|---|---|---|
| CN | 205027525 | 2/2016 |
| CN | 106338405 | 1/2017 |
| JP | 2013205270 | 10/2013 |
| JP | 2017167068 | 9/2017 |
| KR | 20130025997 | 3/2013 |

OTHER PUBLICATIONS

Written Opinion of the International Searching Authority dated Mar. 4, 2020.
International Preliminary Report on Patentability dated May 25, 2021.
English Abstract of CN104897423.
English Abstract of KR20130025997.
English Abstract of CN204788991.
English Abstract of CN106338405.
English Abstract of CN2316662.
English Abstract of CN205027525.
English Abstract of CN204462777.
English Abstract of CN201803855.
English Abstract of JP2017167068.
English Abstract of JP2013205270.

SEMIAUTOMATIC APPARATUS FOR CONDITION-BASED MAINTENANCE OF RAILWAY PANTOGRAPH

CROSS-REFERENCE TO RELATED APPLICATION

The instant application is a national phase of PCT International Application No. PCT/IB2019/060096, filed Nov. 23, 2019, and claims priority to Italian Patent Application Serial No. 102018000010541, filed Nov. 23, 2018, the entire specifications of both of which are expressly incorporated herein by reference.

TECHNICAL FIELD

The present invention relates to the technical field of railway pantograph inspection equipment, in particular semiautomatic condition-based maintenance equipment.

STATE OF THE ART

The emergence of high-speed (HS) train railway required the introduction of technologies for the management and processing of transport-related information. In particular, the components that determine performance and safety form the subject of a digital definition of their characteristics throughout their entire life cycle, with particular emphasis on maintenance. For components whose average cost of repair and/or replacement is comparable with the cost of any downtime, traditional preventive maintenance tends to be replaced by predictive or condition-based maintenance.

Among the train components to which this model can be applied, the railway pantograph is of crucial importance. This component performs a fundamental function by connecting the power supply circuit of electric locomotives with the high-voltage line.

An anomaly in the pantograph may: i) affect the power take-up; ii) limit the maximum operating speed; iii) accelerate the degradation of its components and the catenary; iv) introduce a risk associated with electric arcing and structural collapse.

The ordinary maintenance plans classify the activities into two types of control operations, which are focused on: 1—the portion of the sliding bow in contact with the catenary, known as the sliding joint; 2—the suspensions and structural components.

In the following of this document, we will focus on the second type of analysis. This aims at examining failure scenarios, such as:
  reduction in the thrust force;
  reduction in dissipative capacity;
  reduction in the stiffness of the secondary suspension;
  jamming that hinder upward and downward movements of the pantograph and/or compromise the dynamic stiffness, as a result of macro deformation of the support components and/or stops of the joints;
  breakage of the support components (bushings and bearings) due to overstressing associated with failure to balance the loads;
such breakage, in turn, may be due to localised failure of other parts, which cause alterations in the geometry of the structure.

Where required by routine maintenance procedures, inspections of mechanical and structural parts shall be carried out on site, i.e. with the pantograph mounted on the train's roof, at pre-set kilometre intervals.

As things stand at present, the checks carried out include an initial phase of investigation:
  the evaluation of the intensity of the thrust force;
    this evaluation is carried out by establishing a specific geometric configuration of the pantograph mechanism, known as the framework;
  verification of the shock absorbers;
  verification of the stiffness of the secondary suspension.
  In the event that one of the above checks detects an anomaly, a sequence of targeted inspections shall be carried out, including: —a visual check to ensure that there are no jams during the upward and downward movements cycles of the pantograph;
  geometric checks, focused on:
    the flatness of the frame attachment points of the mechanism and the centres of rotation of the joints;
    the parallelism of the axes of the joints;
  the measurement on the shock absorber test bench.

The current procedures are therefore based on the evaluation of performances outlined specifically for the checks;

In this way, occurrence of only those faults that affect the above tests can be prevented. Moreover, the existence of a single threshold level makes it possible to classify the state of the parts into only two categories (good or damaged parts) without the possibility of extracting information on residual life.

Further functional and geometrical checks, on the other hand, ensure a level of reliability that is a function of the operator's experience and skillfullness, leading to significant variability in judgement.

At present, therefore, there is no procedure that, compatibly with the current inspection, provides for:
  monitoring, at regular intervals, the parts and characteristics currently subject to analysis, as they are fundamental for the functionality of the pantograph, supporting, however, the operator who is expected to be provided with a sensorized and specially designed instrumentation, able to output a quantitative judgment on the outcome of the tests;
  allowing identification of further types of faults and potentially recognizing their location and severity, estimating the residual life of the components;
  requiring the use of no other infrastructures but those currently required.

An inspection procedure corresponding to these requirements involves an analysis conducted on two levels: the first one is aimed at preventing damage of such intensity as to compromise the functional properties of the pantograph; the second one aims at identifying localized defects, which may affect the useful life of only individual components.

According to the state of the art, there are many equipments, CN204788991, CN104897423, CN106338405, CN2316662, CN205027525, CN204462777, CN201803855, responsible for the inspection of the main suspension of the pantograph.

The above mentioned equipments are fitted for the execution of a test, carried out with the pantograph in place, in which a flexible or hollow member is hooked to the framework. The cable control system generates a suitable tension which, by opposing the thrust exerted by the primary suspension, determines a consequent movement of the pantograph. By measuring the tension of the cable and the corresponding height of the pantograph, a profile, called cycle, can be drawn, which is compared with a reference cycle, drawn following a similar test, performed on a pantograph under nominal conditions.

The above systems are characterised by: i) the architecture of the mechanical cable actuation system, ii) the type of sensors and the measurement chain used for the measurement of the quantities of interest; iii) any control logic that determines the law of motion imposed on the framework.

In other equipments, JP2017167068, the evaluation on the functionality of the primary suspension is based on the measurement of the speed of the free climbing motion of the framework, evaluated at a predetermined position, using a laser emitter, attached to the pantograph bow.

The solutions in question make it possible to resolve only part of the above problems by inspecting only the layout of the primary suspension, without being able to locate also the body of the primary suspension where any damage has occurred.

According to the state of the art, there are also equipments for the inspection of dynamic characteristics. They are based on the assumption that a defect alters the mass and/or elasticity and/or dissipative capacity of the structure and suspension of the pantograph. It follows that the evaluation of the dynamic properties obtained from signals that are acquired when the structure shows a vibration regime, allows to derive accurate indicators of both global and localized damages.

In JP2013205270, the characteristics of the nominal dynamic behaviour are determined by test procedures, where the pantograph is in place, but outside the perimeter of the overhead line. In this case, the dynamic impedance of the secondary suspension is evaluation using an input-output identification technique. The input to the system consists of a dynamic forcer applied at the centreline of the bow, while the outputs are represented by the accelerations of two points of the bow, placed symmetrically with respect to the direction of the force. To take into account the dependence of the above dynamic characteristics on the configuration assumed by the mechanism, the test is repeated at different heights of the pantograph.

The inspection phase, instead, proceeds by the measurement of the dynamic impedance, evaluating at the same points, but with a test set-up where the sliding bow is in contact with the catenary. With respect to the test phase, however, it is necessary to provide properly the catenary with sensors and adopt a model that allows evaluation of the impedance of the bow, isolating the contribution resulting from the participation of the catenary to the induced vibration.

This solution focuses only on the secondary suspension, not allowing the identification of any damage affecting the primary suspension and/or pantograph structure.

The document US2018208222 describes the possibility of associating a plurality of sensors directly to the pantograph and combining them with communication, storage and processing systems to manage the acquired data. Piezoelectric sensors can also be used as actuators to induce vibrations in the pantograph. Two possible modes of operation are described: i) the first more is based on continuous or periodic monitoring under operating conditions, i.e. acquiring, at predetermined points on the pantograph, the vibrations induced during normal train operation, once the equipment has been installed on the pantograph; ii) the second mode includes an experimental inspection procedure with the pantograph in place, but at standstill, where the pantograph is placed in vibration under the effect of one or more structure bound piezoelectric sensors used as actuators. The document does not describe the presence of any mechanical structure able to oppose the lifting of the pantograph so that it is not possible to perform the analysis of the opening and closing overall functionality of the pantograph. Moreover, the absence of a mechanical structure able to oppose the lifting force impressed by the pantograph actuating elements requires that the evaluation of the dynamic properties can only take place when the pantograph is in contact with the catenary. Therefore, the effect of the pantograph height and the effect of the contact with the catenary on the estimation of the dynamic properties are neglected.

SUMMARY OF THE INVENTION

Object of the present invention is to overcome the limits of the known technique highlighted above.

Another object of the invention is to propose an apparatus that allows to ascertain, in a single inspection session performed on site, the overall functionality of the suspensions and the structural integrity of the pantograph, also taking into account the dependence of these characteristics on the configuration assumed by the pantograph mechanism.

A specific object of the invention is to propose an apparatus for the inspection of railway pantographs that allows to perform at least two types of non-destructive tests:
  the first one monitors the basic functional properties of the pantograph, through the estimation and analysis of an almost static characteristic cycle, traced at constant speed, imposing up and down movements to the framework;
  the second one aims at identifying defects in the secondary and local suspension, in parts and structure, through the analysis of dynamic signals acquired during an induced vibration regime.

Another object of the invention is to propose an apparatus for the inspection of railway pantographs that is able to perform a dynamic verification of the various parts of the pantograph by applying a controlled dynamic forcer, acting along the degree of freedom of the mechanism and allowing acquiring the resulting vibratory signals at several points of the structure and ensuring that the vibration regime takes place around a predetermined geometric configuration.

Another object of the invention is to propose an apparatus capable of performing a dynamic verification and equipped with an actuation system that simultaneously applies the dynamic forcer and balances the thrust generated by the primary suspension, ensuring that the oscillation of the mechanism occurs around the desired geometric configuration.

Another object of the invention is to propose an apparatus for the inspection of railway pantographs that is capable of performing a dynamic verification of the various parts of the pantograph that is not affected by the contact of the pantograph with the catenary.

Another object of the invention is to propose an apparatus that has an architecture that can apply the two modes of inspection, presenting, in addition, the following characteristics: i) portability; ii) usability; iii) adaptability to different types of pantographs, necessary to meet the requirement of compatibility with the current procedure, in this case, an optimal configuration would be to be able to connect the apparatus directly to the frame of the pantograph, without this leading to permanent alteration of the latter.

In addition, to be able to transmit the dynamic forcer, the device will have to be bound to the pantograph mechanism; this connection implies an inevitable participation of the device in the vibratory phenomenon. The result, in general, is that the dynamic properties measured will not exactly identify the pantograph in the configuration chosen for the test, but, rather, will be referred to the system consisting of the latter and the inspection device. Consequently, another object of the invention is to propose an apparatus suitable to be coupled to the pantograph but in which the effects of such coupling are minimized, in terms of system operation and reliability of the evaluation output about the state of the pantograph.

The above mentioned objects shall be achieved by means of an apparatus for the inspection of railway pantographs comprising:
- a mechanical structure consisting of a main body and connecting structures suitable for detachably connecting the said main body with a fixed frame of a railway pantograph;
- a hybrid transmission comprising
  - at least one flexible and substantially inextensible connecting element associated at one end with the said main body and detachably associated at a second end, in a first operational configuration of the said apparatus, with the mechanism of said pantograph,
  - rigid transmission elements suitable to be connected, in a second operational configuration of said apparatus, on the one end to said main body and to said second end of said flexible connecting elements and on the other end to said pantograph mechanism;
- a first actuating unit arranged to exert a direct tractive force on said flexible and substantially inextensible connecting element in the direction of the only degree of freedom of the pantograph mechanism and in such a direction as to oppose the lifting of the mechanism itself, so determining the height position of said mechanism;
- a second actuating unit arranged to impose an alternating vibratory movement in the direction of the only degree of freedom of the pantograph mechanism on the said rigid transmission components;

so that in said first operational configuration the pantograph mechanism is subject to the traction action of said flexible connecting element determining its height position, while in said second operational configuration the pantograph mechanism is subject simultaneously to the traction action of said flexible connecting element determining its height position and to the action of said rigid connecting elements transferring to it the alternating vibratory movement of said second actuating unit.

Advantageously, the apparatus of the invention includes force sensors, position sensors and vibration sensors.

Again advantageously, the device includes electronic peripherals for data acquisition, data processing and communication between devices.

Again advantageously, the device includes a processing unit configured for data processing and diagnosis.

Again advantageously the apparatus includes man-machine interfaces for the control and management of the maintenance procedure and for the reading and historicisation of the results.

Advantageously, the flexible or hollow connecting element is connected, at one end, to the pantograph mechanism by means of a mechanical interface and is guided by a drum, to which it is bound at the other end, this drum being attached to the output shaft of a rotary servomotor.

Advantageously, in the first operational configuration, the equipment includes at least two sensors: i) one at least mono axial load cell, that is so bound that the voltage in the cable can be measured; ii) an angular position sensor, attached to the servomotor output shaft, through which it is possible to obtain an indirect evaluation of the pantograph height.

Advantageously, the load cell is mounted so that the force applied by the hybrid transmission to the pantograph mechanism can be measured. The load cell output signals, subject to possible conditioning and/or processing and/or conversion inside or outside the sensors, are appropriately acquired by the processing unit and processed to control the spectral form of the dynamic force applied to the pantograph mechanism.

Advantageously, the processor is configured to automatically execute a planned control strategy that imposes a uniform motion condition of the pantograph mechanism by driving the rotary servomotor to adjust the torque intensity applied to the drum and, consequently, the tension at the cable ends.

Advantageously, said second actuating unit includes a linear servomotor, whose movable element or slider is connected to the pantograph mechanism by means of said rigid transmission components.

The balance of the thrust exerted by the main suspension is achieved by connecting the above flexible actuator to the rigid transmission, i.e. adopting a hybrid architecture transmission.

It follows that, during the second inspection mode, the pantograph mechanism is subject, along its degree of freedom, to simultaneous action of the two actuating units.

The resulting force applied to the pantograph will then be determined by the sum of a dynamic component, exerted by the linear actuator and responsible for the vibration speed, and a quasi-static component, necessary to maintain the mechanism configuration, deriving from the voltage generated in the cable, against the torque controlled by the rotary servomotor.

Advantageously, in the hybrid transmission, these rigid transmission components include a telescopic tube so that the extension of the transmission along the axis of the mechanism can be adjusted according to the test height.

Advantageously, the apparatus includes sensors for measuring vibrations such as seismographs, speed sensors, accelerometers, which can be removed at predetermined points of the structure.

The output signals, subject to possible conditioning and/or processing and/or conversion either inside or outside the sensors, are appropriately acquired by the processing unit.

Compliance of the dynamic component of applied force to the desired law is achieved by driving the linear servomotor using a controller that, depending on the planned control strategy, adjusts the intensity of the force applied to the slider.

During the test, the train is isolated from the power supply network; this shall be intended as a preventive measure to reduce the electrical risk to which the operator is exposed during the inspection sessions.

Sources of potential disturbance, such as pantograph loads, external vibrations that may propagate to the pantograph structure or test equipment, or any external source that may influence measurements, should be excluded during the test. Thanks to the apparatus of the invention as outlined above, the inspection of the pantograph can be performed while it is installed on the locomotive but without contact with the catenary or other devices.

Advantageously, the are connected to the pantograph mechanism via a mechanical interface equipped with a quick coupling mechanism.

Advantageously, the load cell is equipped with an additional mechanical interface that allows the cable to be attached during the quasi-static test.

Again advantageously, the mechanical interface of the above mentioned load cell is also prepared for the installation of the telescopic tube with a quick coupling mechanism for the latter connection.

Advantageously, the first actuating unit includes a rotary servomotor with a built-in angular position sensor.

Advantageously, the telescopic tube has one end that allows connection to the load cell's mechanical interface by means of the quick coupling mechanism, and one end equipped with a mechanical interface that allows the cable to be attached thereto.

Advantageously, mutual sliding of the two components making up the telescopic tube is prevented by binding the two aforementioned parts by means of a quick coupling mechanism.

Advantageously, the mechanical interface of the linear servomotor slider is designed for connection to the end of the telescopic tube by means of a quick-coupling mechanism.

Advantageously, the device is advantageously attached to the fixed frame of the pantograph by means of the connecting structures in at least four points, by means of respective quick coupling mechanisms.

An apparatus as outlined above can be configured with a modular architecture that has a main body equipped with all the components necessary for the functions provided by the apparatus and a series of connecting structures, designed to connect the main body to the pantograph frame and responsible for discharging the forces developed during the operation of the apparatus on the pantograph frame, conformed according to the various types of pantograph.

The system is so dimensioned to apply a dynamic forcer capable of energizing the pantograph, such that the measured response is representative of the modes of vibration that involve the suspension and the main components of the structure, while ensuring portability characteristics.

Advantageously, the second actuator unit has such size and is so controlled to exert a dynamic forcer in a frequency range of 0-20 Hz.

The hybrid transmission is so dimensioned that its installation involves a less than 10% variation of the modal parameters of the pantograph, in the frequency range excited by the forcer.

Advantageously, the mechanical structure and the quick coupler mechanisms for the connection to the fixed frame of the pantograph are advantageously sized so that the system made up of the apparatus bound to the pantograph is such that the first way of vibrating involving the mechanical structure of the apparatus is associated with a relative frequency at least equal to 200 Hz, i.e. one order of magnitude higher than the band of frequencies excitable by hybrid transmission.

BRIEF DESCRIPTION OF DRAWING

These and other characteristics of the invention will be more easily understood by the following description of embodiments provided as non-exhaustive examples, with reference to the attached figures in which.

DESCRIPTION OF THE PREFERRED EMBODIMENTS

Figure 1:
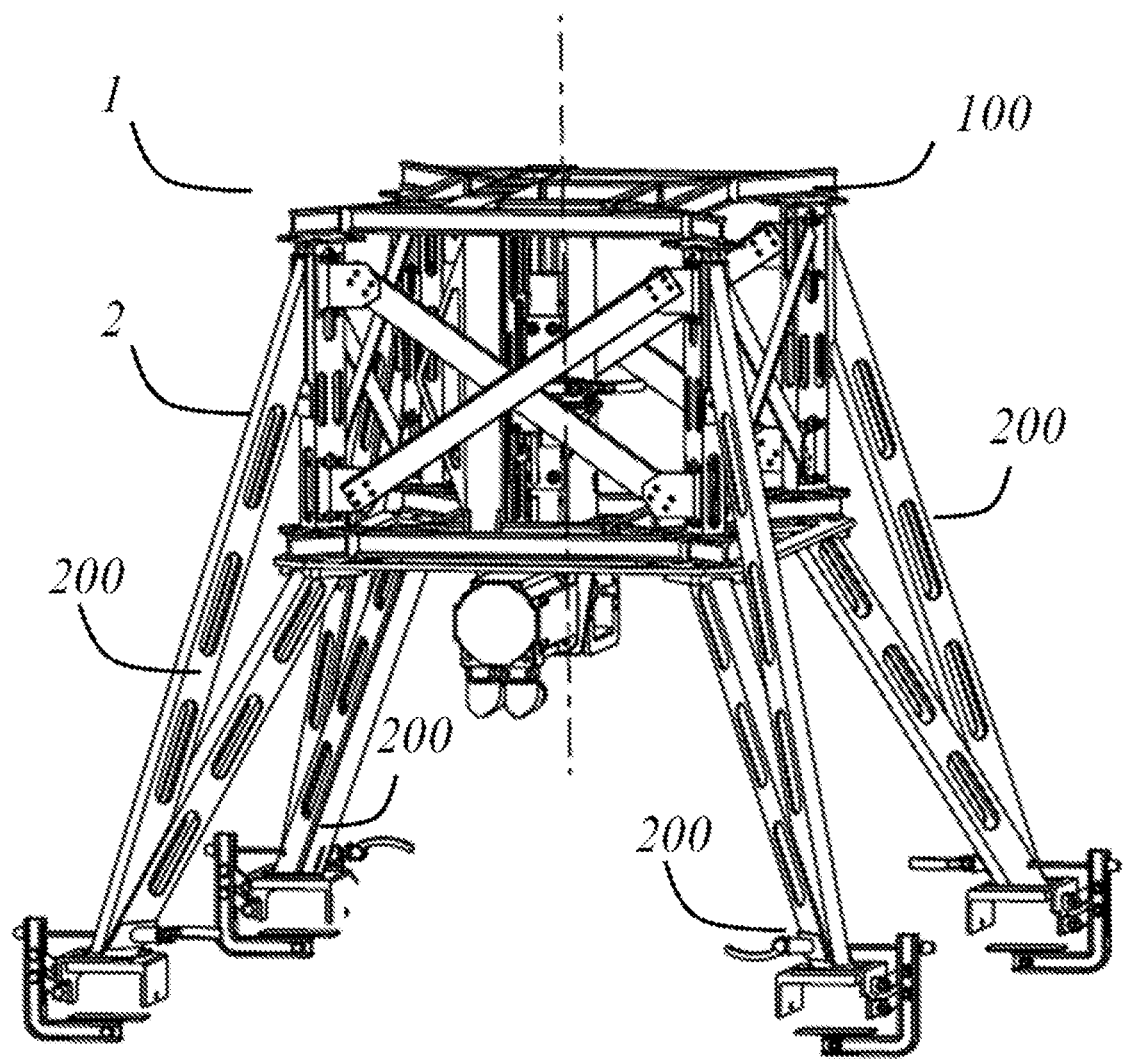
FIG. 1 shows a perspective view of the mechanical structure of an apparatus according to the invention.

With reference to FIG. 1, a preferred embodiment of an apparatus 1 for the inspection of railway pantographs according to the invention includes a mechanical structure 2. The above mentioned mechanical structure 2 is provided with an axis of symmetry and is also symmetrical with respect to two mutually orthogonal main planes which include the above axis of symmetry. Said mechanical structure 2 consists of a main body 100, equipped with all the parts necessary for the functions provided by apparatus 1, and a series of connecting structures 200, designed to connect the main body 100 to the frame of a pantograph, and consisting in this example embodiment of four structural elements or legs equal to each other.

The main body 100 shows a parallelepiped-shaped envelope, approximately cubic. The orientation of the above envelope is such that the base surfaces are orthogonal to the above axis of symmetry and each of the two pairs of lateral surfaces is parallel to one of the above two planes of symmetry. The lower base surface of the parallelepiped envelope of the main body 100 lies in a plane which we shall indicate as a horizontal plane.

Figure 2:
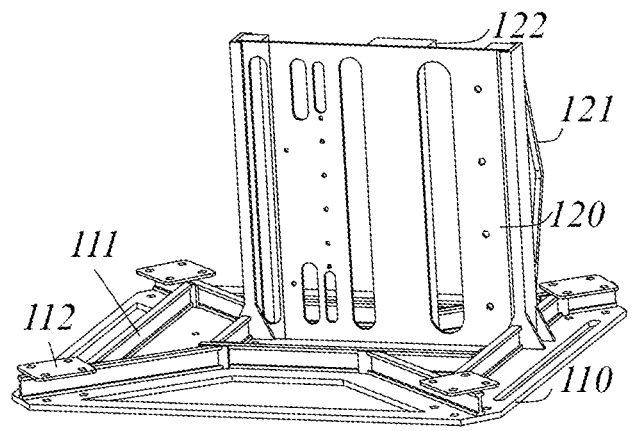
FIG. 2 shows a perspective view of a portion of the mechanical structure of FIG. 1 representing two welded plates belonging to the central body of FIG. 1.

With reference to FIG. 2, in the above mentioned horizontal plane there is a base structure 110 composed of a planar plate, stiffened by welded beams 111, which increase the bending stiffness with respect to the laying plane. The enveloping perimeter of the aforementioned base structure 110 is rectangular, approximately square. On the upper surface of the base structure 110, approximately in correspondence with the centre line of one of the two shorter perimeter sides, there is welded a support plate 120, that is composed of a plate with planar development and that is orthogonal to the horizontal plane and also orthogonal to the aforementioned side. The rectangular profile of the aforementioned support plate 120 has the largest side arranged vertically; the shorter side extends for about three quarters of the larger side of the base structure 110. The above mentioned support plate 120 is also equipped with ribs, 121, which increase the bending stiffness with respect to the laying plane.

Figure 3:
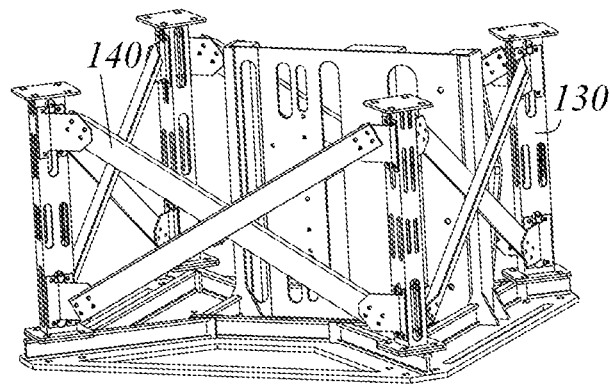
FIG. 3 shows a perspective view of a portion of the mechanical structure of FIG. 1 depicting a configuration assumed by the plates of FIG. 2 after the assembly of uprights.

With reference to FIG. 3, the basic structure 110 is equipped with flanges 112 at its four vertexes, which allow the assembly, by means of bolt connections, of upright elements 130 having straight axis line and arranged vertically, acting as uprights.

Figure 5:
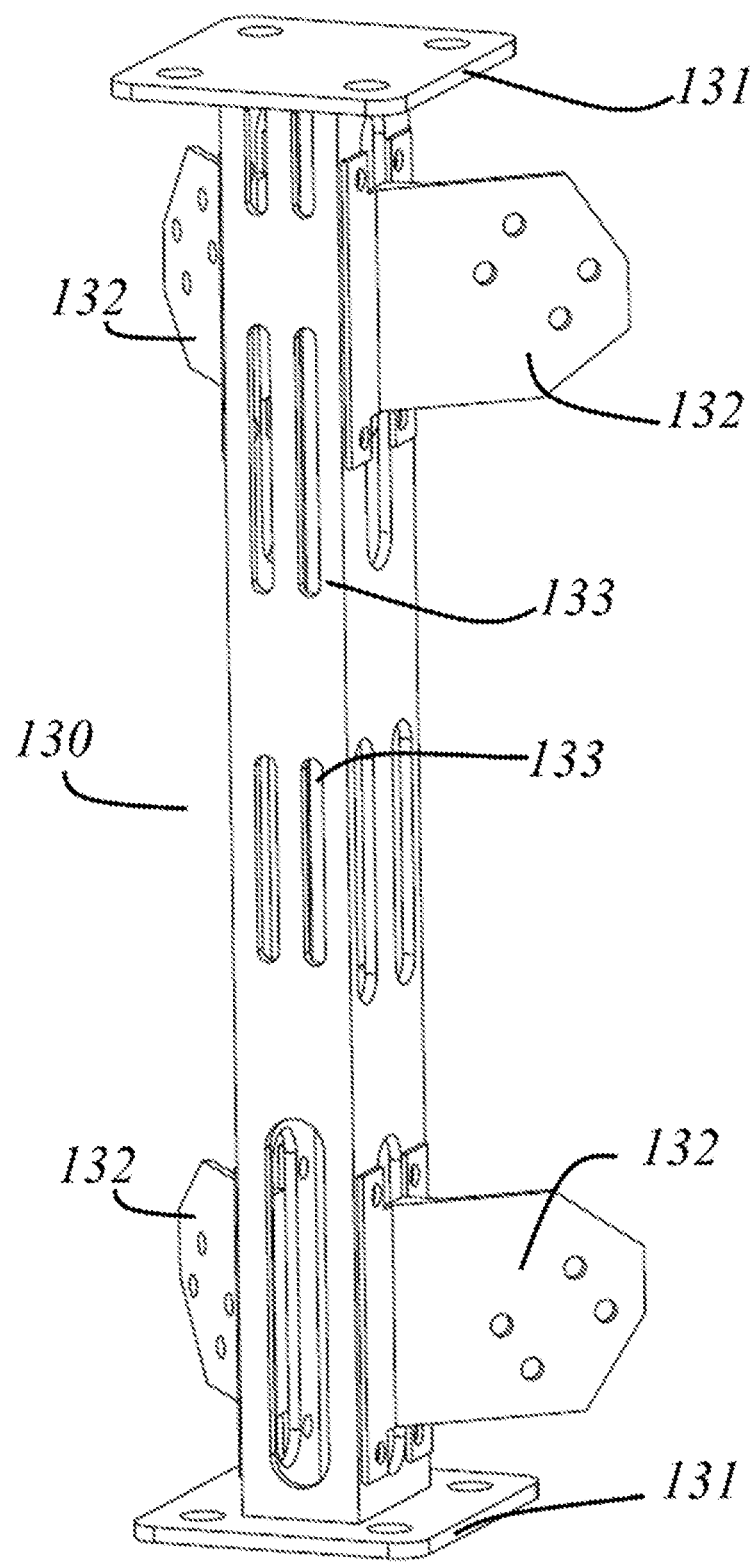
FIG. 5 shows a perspective view of an upright of FIG. 3.

With reference to FIG. 5, each upright element 130 is equipped with a connection plate 131 at the upper and lower ends, so that the assembly of each 130 upright element with respect to the corresponding flange 110 is carried out by bolting the lower connection plate 131 with the flange 112.

With reference to FIG. 3 and FIG. 5, in the horizontal plane, the upright elements 130 are oriented so that the centres of gravity of their cross-sections lie on the diagonals joining the vertexes of the basic structure 110. The upright element 130 has also a hollow rectangular cross-section and is oriented in the horizontal plane, so that the largest side of the rectangular cross-section is parallel to the diagonal of the base structure 110 in which the centre of gravity of its own cross-section lies. Each upright element 130 is fitted with a pair of connecting brackets, 132, at the upper and lower ends, welded to the orthogonal lateral surfaces at the longer sides of the said rectangular section. These connecting brackets 132 shall be shaped in such a way as to allow the connection between each of the four pairs of uprights 130, identified by the lateral surfaces of the parallelepiped envelope of the main body 100. In particular, taking one of the four surfaces in consideration, the connection between the two uprights 130 is made by means of two one-dimensional structural elements, 140 having a straight axis line contained in said flat surface, and arranged in an X-shape, so as to bind, by means of bolt connections, the connecting bracket 132 located below the first upright element 130 with the connecting bracket 132 located above the second upright element 130 and vice versa.

On the two lateral surfaces orthogonal to the smaller sides of said rectangular section, each upright 130 has slots, 133, for connection to one of the connecting structures 200. Each upright 130 has lightening slots made in the two lateral surfaces orthogonal to the smaller sides of the said rectangular section. The height of the upright elements 130 is such that the corresponding upper connecting plates 131 are separated from the upper surface of the base structure 110 by an amount equal to the vertical extension of the support plate 120.

Figure 4:
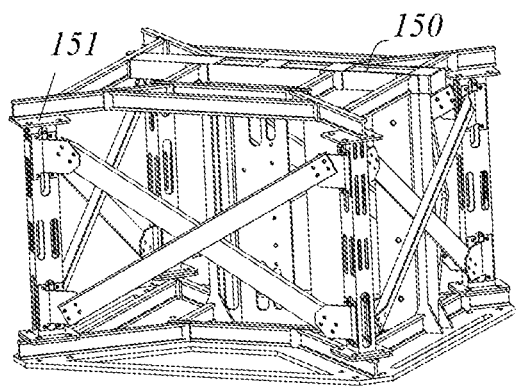
FIG. 4 shows a perspective view of a portion of the mechanical structure in FIG. 1 depicting a final configuration assumed by the central body in FIG. 3 after the installation of wall beams and cover frame.

With reference to FIG. 4, the upper surface of the parallelepiped envelope of the main body 100 consists of a frame 150 composed of beams welded together to form a planar structure, whose envelope is rectangular, approximately square and coinciding with the relative envelope of the basic structure 110. The frame 150 is also suitably shaped to allow the motion without interference of the components making up the transmission chain. At the four vertexes of the envelope, the frame 150 is fitted with flanges 151, which allow it to be mounted, by means of bolted connection, to the upper connection plates 131 of the uprights 130.

In this way, the frame 150 serves as a cover for the main body 100; it is also bolted to the upper horizontal surface of dowels, 122, welded to the support plate 120.

Figure 6:
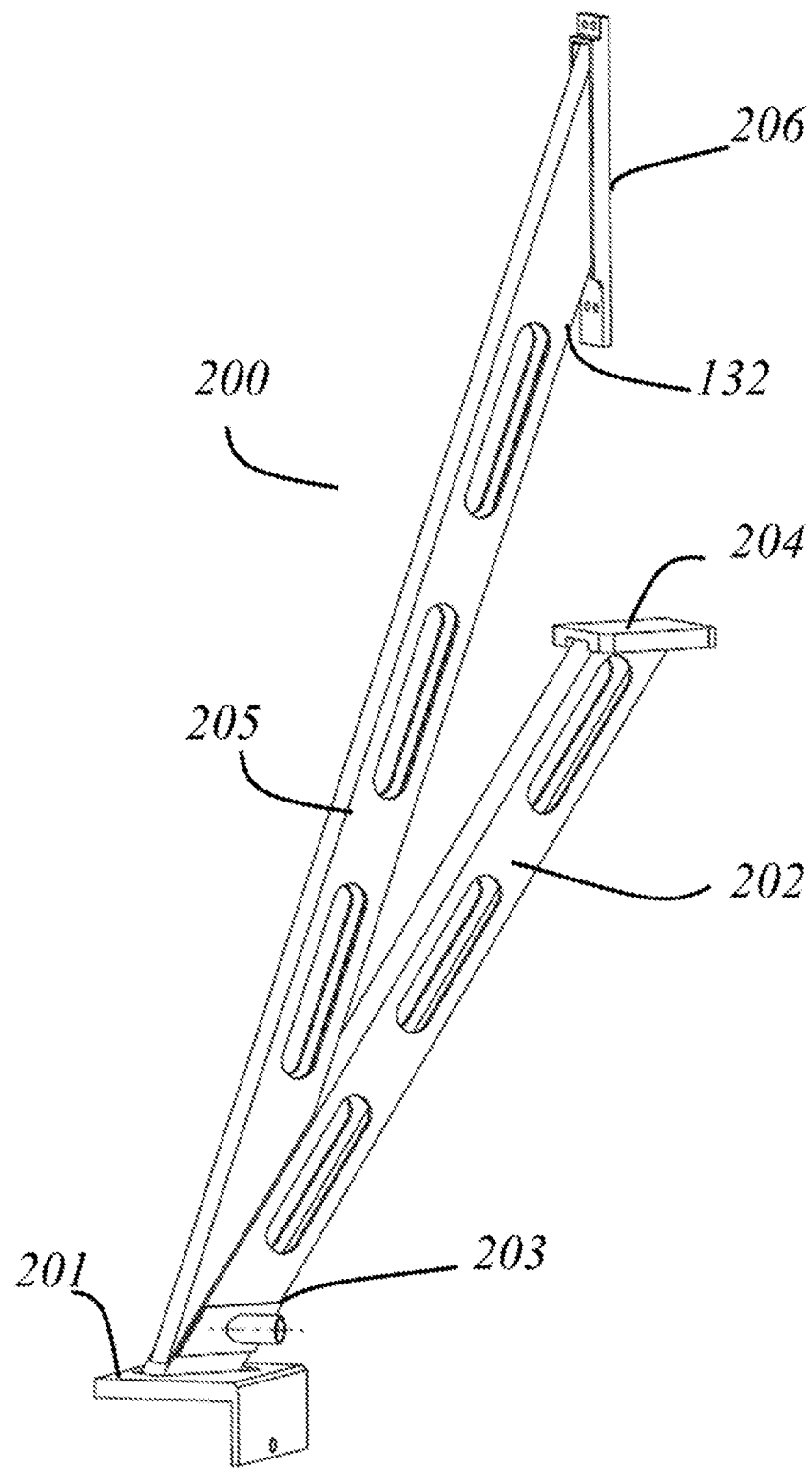
FIG. 6 shows a perspective view of an upright of FIG. 1.

With reference to FIG. 6, a preferred embodiment of a connection structure 200 consists of an interface 201 and two beam elements 202 and 205. The interface 201 takes on a geometrical shape that can be thought of as the extrusion of an L-profile. The depth of the above mentioned extrusion is approximately equal to the length of the greater wing of the above mentioned L. In the course of this document we will indicate with frontal plane the plane of symmetry within which the profile of interface 201 takes the form of L. The extrusion of the L-shaped profile generates two pairs of surfaces, one internal and one external with respect to the profile itself. In the course of this document we will indicate: i) base surface, meaning the internal surface with respect to the L-profile, placed orthogonally to the longest wing; ii) greater surface area, meaning the outer surface of the L-profile at right angles to the longest wing; iii) lateral surface area, meaning the outer surface area relative to the L-profile at right angles to the shortest side. The connection between the first beam-shaped element 202 and the interface 201 shall be made by welding between one end of the first beam-shaped element 202 and the upper surface of the interface 201.

The beam-shaped elements 202 and 205 extend with a straight axis line and each has a rectangular cross-section. The first beam-shaped element 202 is shaped in such a way that, approximately at the end where it is welded to the interface 201, and on its lateral surface parallel to the plane of maximum inertia and facing the lower wing of the L of interface 201, a second interface 203 is welded. The second interface 203 is in turn composed of a plate, which is welded with the first beam-shaped element 202, and a hollow cylindrical body, whose axis belongs to the intersection of a plane parallel to the base surface of the interface 201 and the front plane of the interface 201. The second interface 203 has an additional circular and coaxial cavity with respect to the through-hole. This cavity has a diameter that is larger than the through-hole and extends axially for a length equal to about half the external diameter of the second interface 203. In addition, the first beam-shaped element 202 has a through-hole, coaxial and at least equal in diameter to the through-hole of the hollow cylindrical body of the second interface 203.

In particular, the two beams 202 and 205 are welded together and mutually oriented so that the maximum inertia planes coincide. Within the common plane of maximum inertia, the respective axis lines depart approximately from a common origin and have a relative inclination of approximately 14 degrees. In addition, the two beam-shaped elements 202 and 205 have a certain number of lightening notches along the lateral surfaces parallel to the common plane of maximum inertia.

The end section of each of the two beam-shaped elements 202 and 205 not welded to the other one, is so shaped as to be prepared for welding to interface plates, which are used for the connection with the main body 100 through bolts of the connection structure 200. In particular, a first plate 204 is welded to the first beam-shaped element 202, so that the first plate 204 is arranged parallel to the upper surface of the interface 201; a second plate 206 is welded to the second beam-shaped element 205, and is shaped in such a way that the second plate 206 is orthogonal to the upper surface of the interface 201 and to the common plane of maximum inertia of the beam-shaped elements 202 and 205. The connection between the connecting structure 200 and the main body 100 is made first by means of the bolted connection between the first plate 204 and the lower surface of the base structure 110, and then by means of the bolted connection between the second vertical plate 206 and the side surface of the strut element 130, parallel thereto. As a result of this connection, the projection in the horizontal plane of each first plate 204 coincides with the corresponding projection of the cross section of the upright element 130 and each interface 201 is parallel to the horizontal plane. In addition, each connecting structure 200 is oriented with respect to the main body 100 so that the plane of maximum areal moment of inertia of the connecting structure 200 coincides with the vertical plane containing the diagonal of the support plate 120, passing through the vertex where the first plate 204 connects to the base structure 110; in particular, observing a section obtained by intersecting mechanical structure 2 with the aforementioned vertical plane, the angle formed between the axis line of the first beam-shaped element 202 and the trace of the horizontal plane is approximately 55 degrees.

In addition, the 201 interface is oriented with respect to the envelope of the main body 100 so that the side surface of the 201 interface faces the side surface of the main body 100 and is parallel to the support plate 120. In addition, the hollow cylindrical body of the second interface 203 extends from the surface of the first beam-shaped element 202, pointing toward the lateral surface of the main body 100, presenting an axis orthogonal to the support plate 120.

The orientation of the structural elements presented is such that mechanical structure 2 can be thought of as consisting of two flat frameworks, formed by the vertical planes passing through the diagonals of the rectangular profile of the base structure 110. In particular, considering each diagonal plane, the framework consists of pairs of connecting structures 200 and upright elements 130 arranged at the opposite vertices, and of welded beams 111 and the frame 150 belonging to the plane being considered; in addition, said structural elements are so oriented as to present the maximum areal inertia in the diagonal plane considered. The three-dimensional structure is generated by the connection between the aforesaid flat beams, which connection is made by means of the one-dimensional structural elements 140. The mechanical structure 2 generated in this way is predisposed to be characterized by an optimal stiffness and weight ratio.

Figure 7:
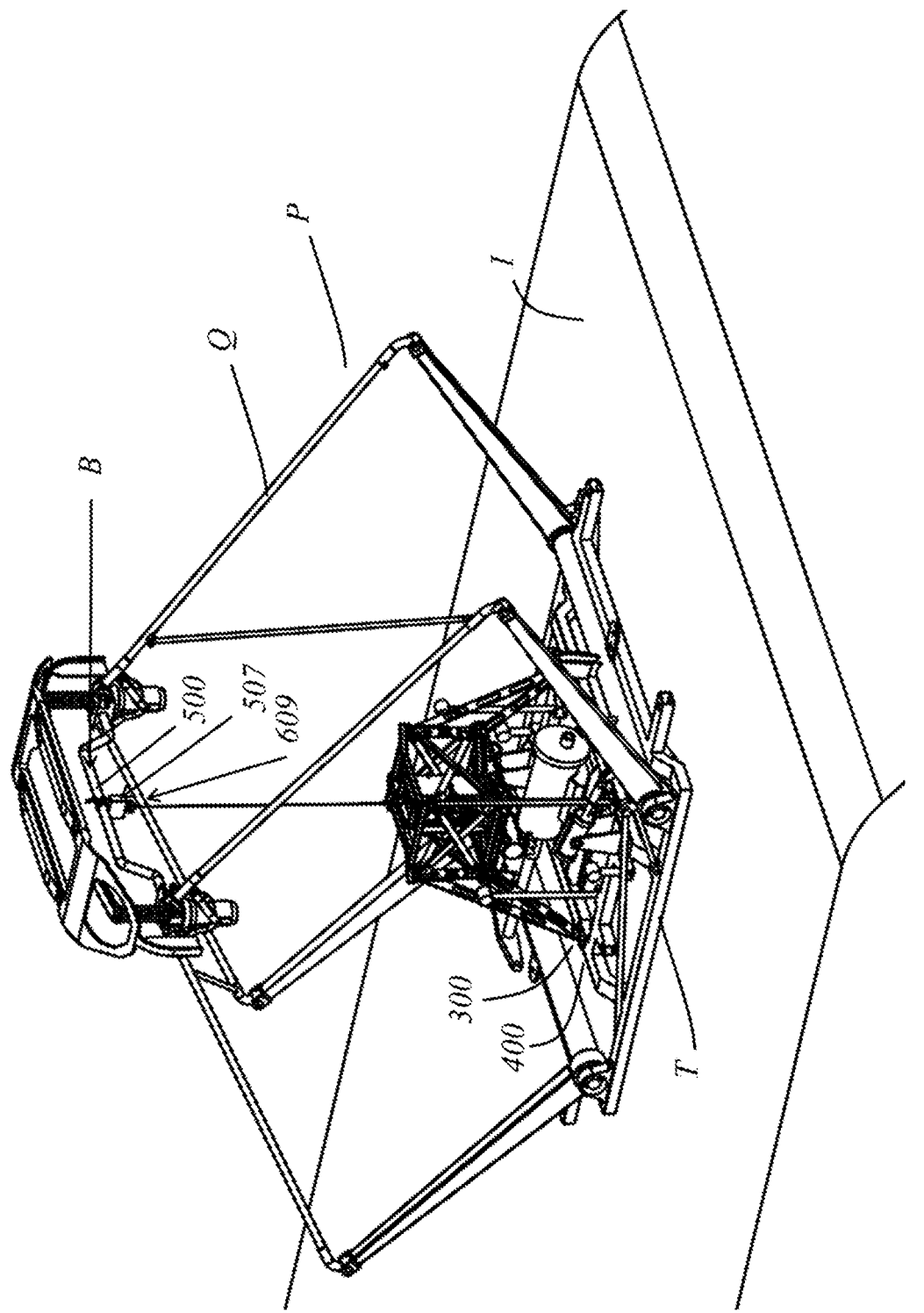
FIG. 7 shows a perspective view of the apparatus according to invention in the use configuration and associated with the first test mode.

With reference to FIG. 7 and in the following description of the embodiments, reference is made, for sake of simplicity, to the longitudinal, transversal location in relation to the orientation of a railway pantograph P, with respect to the advancement direction of the respective railway locomotive. Reference is made to the direction orthogonal to the roof surface of locomotive I as vertical direction. It appears that the pantograph P has symmetry with respect to the two mutually orthogonal longitudinal and transverse main planes, passing through the vertical axis along which the degree of freedom of the pantograph mechanism Q is extended, which is therefore an axis of geometric symmetry.

In the following description of the design forms and with reference to FIG. 7, FIG. 8 and FIG. 9, reference is made to a pantograph P including a fixed frame T of the pantograph which, in correspondence of the contact points with the interfaces 201 of apparatus 1, has a beam shape, whose axis line is perpendicular to the transversal plane of the pantograph P, has a hollow rectangular section oriented in the said transversal plane, so that the smaller side of the rectangle is parallel to the vertical direction. In the course of this document, the terms upper and lower horizontal surface will indicate the lateral surfaces of the said beam orthogonal to the longer side of the rectangular section of the fixed frame T, and lateral surfaces will indicate the orthogonal surfaces to the shorter sides of the rectangular section of the frame T. On the lateral surface of the interface 201 there is a threaded through hole; the axis of this hole lies in the front plane of the interface 201 and is located approximately near the end of the lower wing of the L-profile. A setscrew 301 is engaged in this hole, which is screwed in until the tip of the screw reaches the side surface of the fixed frame T.

Figure 8:
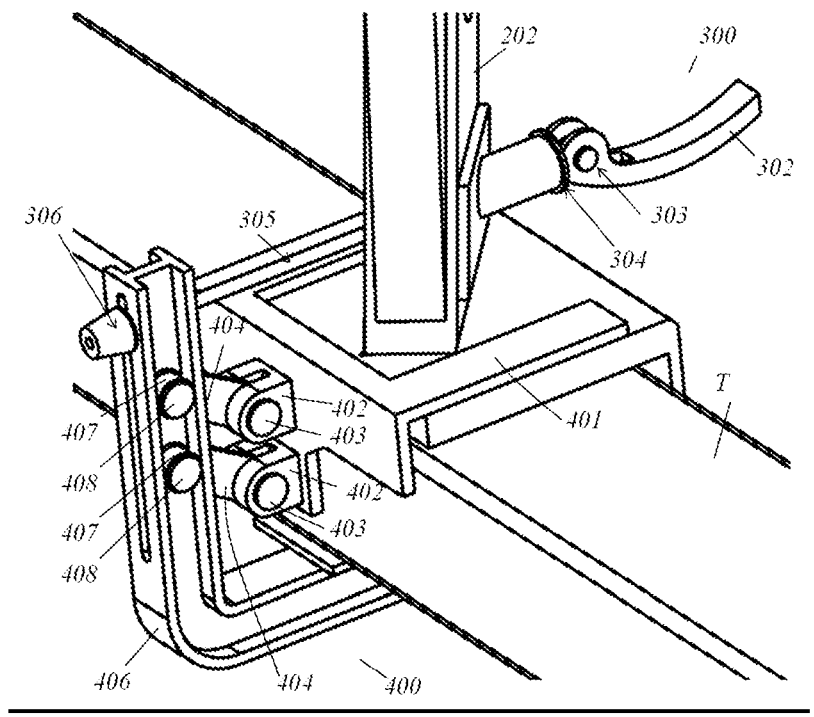
FIG. 8 shows a perspective view of a portion of the mechanical structure in FIG. 1 representing the hooking system that allows the connection of the second invention apparatus to the pantograph frame before performing the test mode illustrated in FIG. 7.
Figure 9:
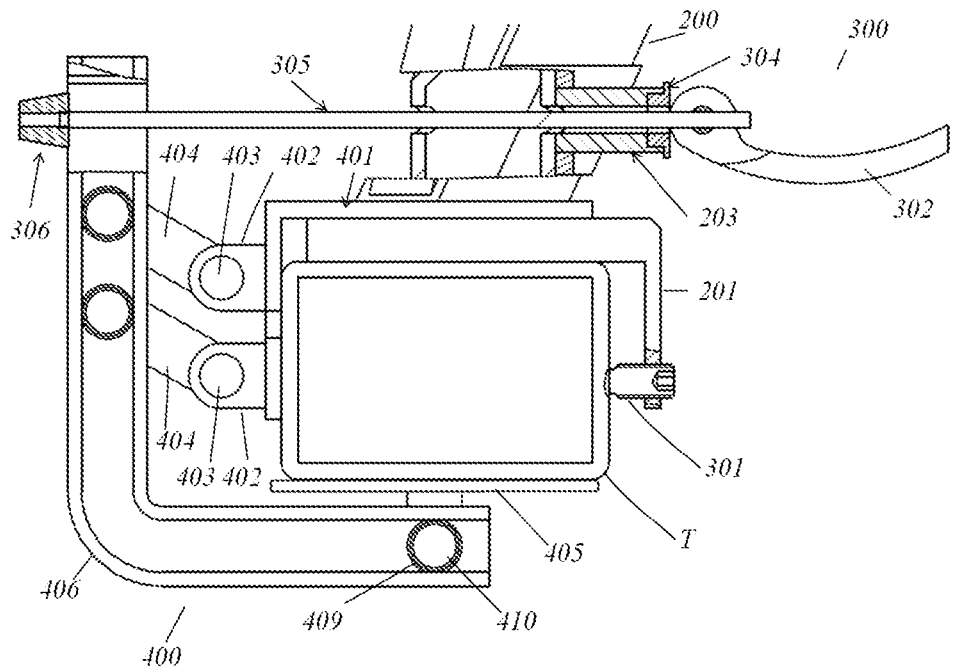
FIG. 9 shows a partial section view of the hooking system in FIG. 8.

With reference to FIG. 8 and FIG. 9, actuating means, 300, are designed to operate the respective quick coupling mechanisms, 400, designed to permanently bind a connecting structure 200 to the fixed frame T. Each actuating means, 300, is equipped with an actuating lever 302, which has a region determined by the extrusion of a cam profile with eccentric and a region determined by the extrusion of a flat arc that forms the handle of the actuating lever 302 itself. The actuating lever 302 is also equipped with a groove orthogonal to the extrusion plane, which identifies two support seats whose axis is orthogonal to the plane containing the eccentric cam profile and inside which a pin 303 is fitted. The lateral cylindrical surface of pin 303 has a threaded through-hole, so that the assembly consisting of the actuating lever 302 and pin 303 can be constrained thereto by means of a threaded connection to the threaded tie rod 305. The eccentric surface of the operating lever 302 insists on a push body 304. This push body 304 consists of two cylindrical, coaxial bodies, of which the body with the smaller diameter acts as a centering element, having a diameter coinciding with the diameter of the circular cavity present in the second interface 203. The assembly consisting of the actuating lever 302, the pin 303, the push body 304 and the tie rod 305 is mounted on the connection structure 200 by inserting the tie rod 305 in the coaxial holes having the same diameter and made in the cylindrical body of the second interface 203 and in the first beam-shaped element 202 respectively. The insertion is stopped when the push body 304 comes to a stop with the front surface of the cylindrical body 203 cavity. Each quick coupling mechanism 400 is equipped with the following basic elements: a fork, 401, two levers, 404, an interface element, 405, a J lever, 406.

The 401 fork can be thought of as originating from the extrusion of an L-shaped profile. In the course of this document we will indicate with frontal plane the plane within which the 401 fork takes the shape of L. The depth of this extrusion is approximately equal to the length of the greater wing of the aforementioned L and coinciding with the depth of the respective L-profile extrusion of the 201 interface. The extrusion of the L-shaped profile generates two pairs of surfaces, one internal and one external with respect to the profile itself. In the course of this document we will indicate:

i) resting surface, meaning the internal surface with respect to the L-profile, placed orthogonally to the longest wing;
ii) lateral internal surface, meaning the internal surface area relative to the L-profile set at right angles to the shortest side. iii) lateral external surface, meaning the external surface in relation to the L-profile, set at right angles to the shortest length wing. The lateral surface of the fork 401 is also shaped as a T. On the external lateral surface of the fork 401 there are two seats, 402, inside of which two pins, 403, are fitted for their entire length. The position of the seats 402 is such that the axes of the pins 403 are parallel and the plane containing them is parallel to the outer lateral surface of the fork 401.

Each of the seats 402 has a groove perpendicular to the outer lateral surface of the fork 401, which allows the pin 403 to be inserted into one of the seats of said lever 404, when lever the 404 has been placed inside the groove perpendicular to the outer lateral surface of the fork 401.

In the plane containing the resting surface, the fork 401 has a rectangular recess whose depth is less than the length of the longer wing of the L-shaped profile, giving the resting surface of fork 401 a U shape.

The interface element 405 consists of a flat, rectangular plate with a support seat at the centre of this rectangle, whose axis is parallel to the plane containing the plate and orthogonal to the longer side of the rectangular profile.

The J-lever 406 is a one-dimensional element whose axis line lies in a plane, called front plane, where the axis line takes the form of a J and whose cross-section takes the form of an I. The lateral surfaces orthogonal to the wings of the I-section have two through grooves, one extending for almost the entire vertical section of the J-lever 406 and a second extending near the end of the horizontal section of the J-lever 406. On each of the surfaces lateral and orthogonal with respect to the rib of the I-section, there are two support seats 407. They are symmetrical with respect to the frontal plane of the J-lever 406, so that each of two additional pins 408 can be fitted into the support seats 407, thus resulting twice supported.

The distance between the axes of the pairs of support seat 407, evaluated along the axis line of the J-lever 406 coincides with the distance between the seats 402.

The ends of levers 404 that do not engage the pins 403 are designated as slots for the additional pins 408, so that the levers 404 are contained within the through groove made on the J-lever 406.

In this way, the J-lever 406 is bound to the fork 401 by the levers 404, so that the relative motion of the J-lever 406 with respect to the fork 401 is a translation along the direction parallel to the lower side of the L of the fork 401.

On each of the surfaces lateral and orthogonal to the rib of the I-section of the J-lever 406, there are two additional support seats 409, located near the end of the horizontal section of the J-lever 406. They are symmetrical with respect to the frontal plane of the J-lever 406, so that a third pin 410 can be fitted into the additional support seats 409, thus resulting twice supported.

The third pin 410 can thus be fitted inside the seat of the interface element 405, when this seat has been placed inside the groove made in the J-lever 406.

With reference to FIG. 9, the assembly of the quick coupling mechanism 400 includes: i) setting the quick coupling mechanism 400 with respect to the interface 201, making the support surface of the fork 401 coincide with the upper surface of the interface 201; ii) orienting the quick coupling mechanism 400 by inserting the tie-rod 305 into the groove in the J-lever 406; iii) screwing, without tightening, an adjusting nut 306 to the tie rod, so that it can be used as a limit switch for mounting the mechanism; iv) approaching the quick coupling mechanism 400 to the fixed frame T, by means of a sliding motion in the plane containing the support surface of the fork 401, until the inner lateral surface of the fork 401 reaches the stop with the lateral surface of the fixed frame T; v) moving only the J-lever 406 along the vertical direction until the plate of the interface element 405 reaches the stop with the lower horizontal surface of the fixed frame T; vi) tightening the adjusting nut 306.

Starting from this configuration, tightening of the operating lever 302 is achieved by moving the end of the handle towards the connection structure 200. The manual application of the tightening force causes a tension in the tie rod 305, which becomes deformed and stretches. The tension in the tie rod 305 is relieved by means of the adjusting nut 306 on the J-lever 406. For the J-lever 406 to remain in static equilibrium, the levers 404 and the interface element 405 must exert balancing forces on the J-lever 406. These balancing forces correspond to equal and opposite reactions, which are discharged onto the fixed frame of the pantograph T and thus generate tightening forces. In the absence of friction between the surfaces of the quick coupling mechanism 400 and the surfaces of the fixed frame T, the internal lateral surface of the fork 401 exerts on the lateral surface of the fixed frame T: i) a force parallel to the direction of the levers 404 and directed towards said surface of the fixed frame T; ii) a resulting moment acting in the front plane of the J-lever 406 and oriented counterclockwise. In addition, in the same hypothesis of negligible friction, the interface element 405 exerts a vertical force on the lower horizontal surface of the fixed frame T, oriented towards said surface of the fixed frame T. The intensity of the said tightening forces is determined by the geometry of the quick coupling mechanism 400. In the presence of friction, the above-mentioned tightening forces will no longer correspond to the above-mentioned equilibrium relations, while the relative motion between the mechanical structure 2 and the fixed frame T will be prevented also by the presence of the additional tangential forces acting on the interface surfaces.

Figure 10:
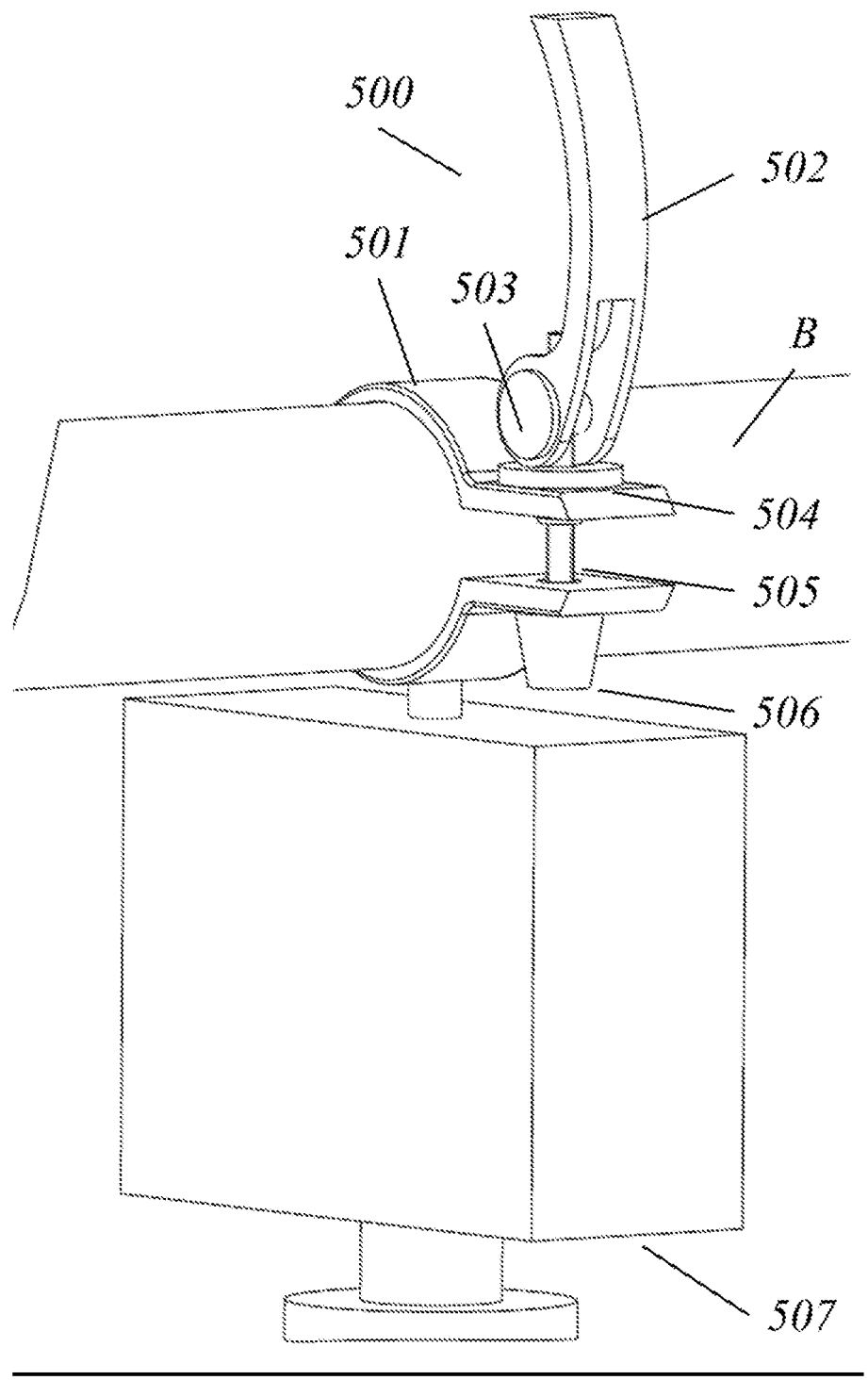
FIG. 10 shows a perspective view of a portion of the apparatus according to the invention in the use configuration shown in FIG. 7, depicting the system for connection of the load cell to the pantograph mechanism.

With reference to FIG. 7 and FIG. 10, an apparatus according to the present invention includes a load cell 507 that is connected in removable mode to the torsion bar B of the pantograph P by means of a second quick coupling mechanism 500. The load cell 507 is mounted to the torsion bar B by means of a threaded interface hole which allows it to be rigidly connected to the second quick coupling mechanism, 500. The aforementioned second quick coupling mechanism 500 consists of the following elements: a collar 501; a lever with eccentric 502, a pin 503, a push body 504, a tie rod 505; an adjusting nut 506. The collar 501 can be thought of as generated by the extrusion of a flat profile. The aforementioned profile of collar 501 consists of a thin-ring portion, whose circular profile is interrupted by an opening of approximately 335 degrees. The ends of the ring are welded to the wings, parallel and symmetrical with respect to an axis passing through the centre of the circular envelope of the ring and bisecting the aforementioned opening. On the lateral surface of the wings, at about the end of the wing itself, there are coaxial holes of equal diameter, passing through the entire thickness of each wing. A threaded tang is welded to the lateral surface of the collar 501, at a 90 degrees angular distance from the opening of the ring.

The operator sets the collar 501 at the centerline of the torsion bar B, orienting it so that the axis of the threaded tang coincides with the axis of the pantograph Q mechanism. The components of this second quick coupling mechanism 500 are similar to those of the aforementioned quick coupling mechanism 300; In particular: the lever with eccentric 502 is fully comparable to the actuating lever 302; pin 503 is fully comparable to pin 303;

push body 504 is fully assimilable to push body 304; the tie rod 505 is fully comparable to tie rod 305. In this way the assembly consisting of the lever with eccentric 502 and the pin 503 can be connected to the threaded tie rod 505 by means of a threaded connection. The push body 504 is inserted until it stops inside the hole drilled in the upper wing of the collar 501. The assembly consisting of the lever with eccentric 502, the pin 503 and the tie rod 505 is then inserted into the coaxial holes until the lateral surface of the lever with eccentric 502 reaches the stop with the support surface of the push body 504.

Tightening of the second quick coupling mechanism 500 to the torsion bar B of the pantograph is achieved by moving the end of the lever handle with eccentric 502 towards the torsion bar B. Manual application of the tightening force causes a tension in the tie rod 505 which deforms and stretches. The tension in the tie rod 505 is discharged on the wings of the collar 501 via the push body 504 and the adjustment nut 506. For the collar 501 to remain in static equilibrium, normal and tangential forces must develop along the inner surface of the ring in contact with the torsion bar B, which balance the forces exerted by the adjusting nut 506 and the push body 504, equivalent to the tension generated in the tie rod 505. Equal and opposite forces exerted by the collar 501 on the surface of the torsion bar B are the tightening forces developed by the second quick coupling mechanism 500.

Figure 11:
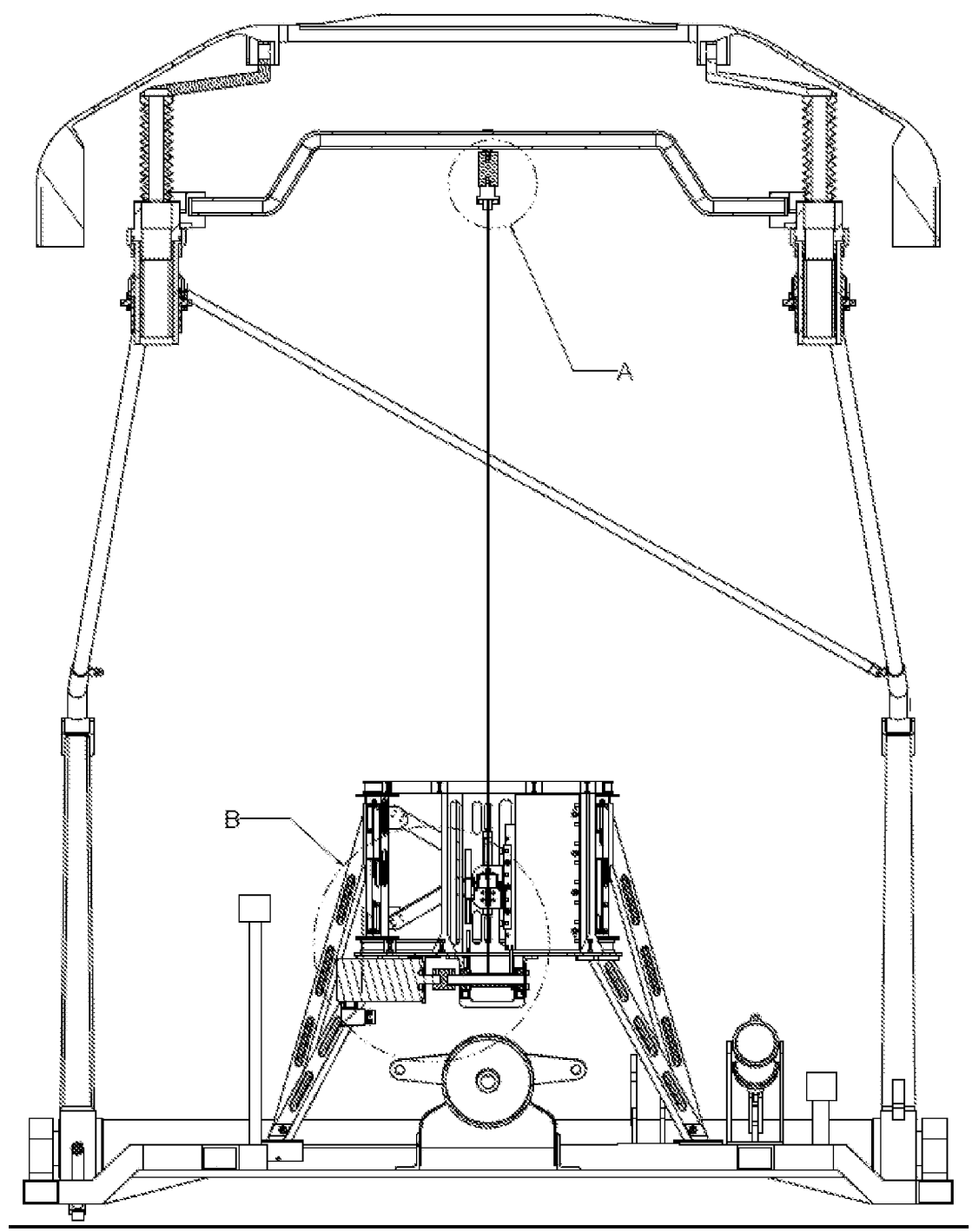
FIG. 11 shows a section view of the apparatus according to the invention in the use configuration shown in FIG. 7.
Figure 12:
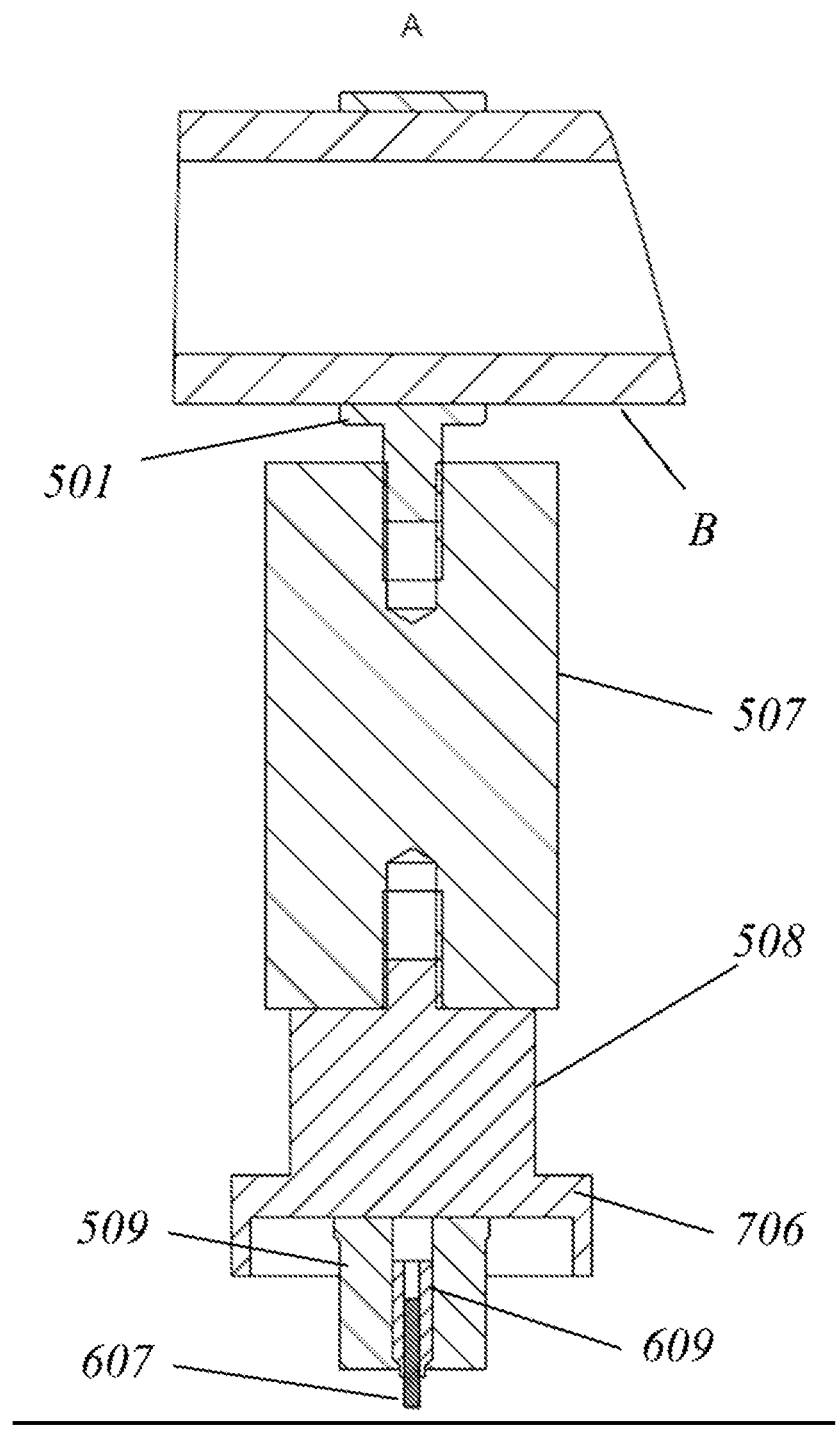
FIG. 12 shows the enlarged detail A from the section view in FIG. 11 depicting the interfaces for connecting the flexible device to the load cell.

FIG. 11 shows a section obtained by intersecting the view shown in FIG. 7 with the transverse plane of the pantograph P. With reference to the enlarged detail A shown in FIG. 12, the load cell 507 has a threaded hole made therein for rigid connection to a first coupling element 508. The aforementioned first coupling element 508 has an axisymmetric geometry consisting of 3 cylindrical bodies arranged consecutively along the axis with increasing diameter, including: i) a threaded tang for connection to the corresponding hole in the load cell 507; ii) a cylindrical body with intermediate diameter; iii) a cylindrical body with maximum diameter with a cylindrical cavity whose depth is approximately equal to the axial extension of the said cylindrical body with maximum diameter. The diameter of the cylindrical cavity shall be such that the cylindrical body with maximum diameter takes the form of a thin ring in the region along which the cavity extends. On the surface orthogonal to the axis of symmetry and internal to the cavity there is a rigid connection with a second coupling element 509, to which the free end of a cable 607 is attached, through a relative terminal of the cable 609. This terminal 609 takes on a shape consisting of two cylindrical bodies with different diameters, between which there is a chamfer. The shape of this chamfer corresponds to the seat of the second coupling element 509, which is designed to bind the terminal 609. The terminal 609 also has a through-hole with a nominal diameter equal to the diameter of the cable 607.

Figure 13:
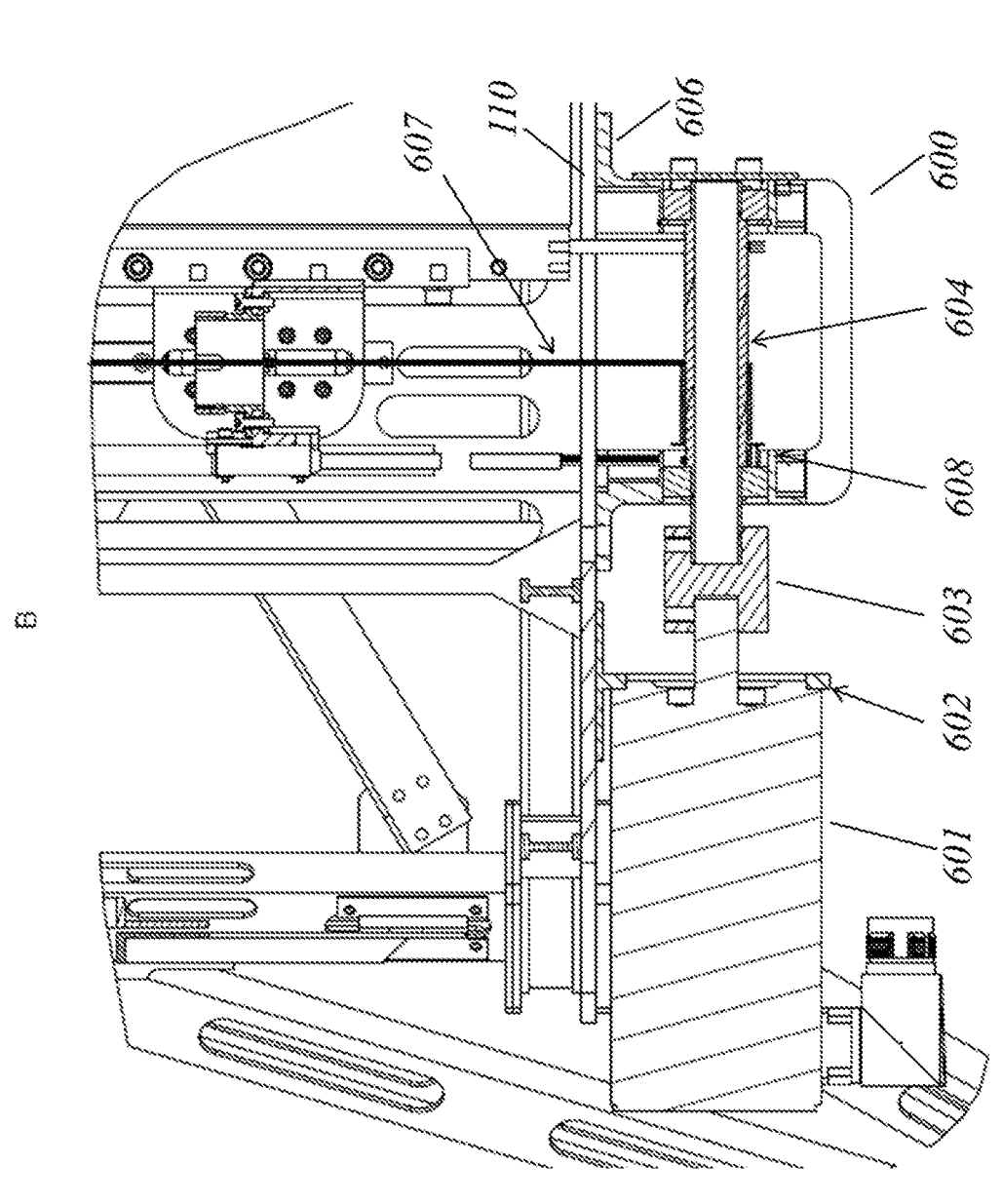
FIG. 13 shows the enlarged detail B from the section view of FIG. 11 depicting the rotary actuator in the operating configuration associated with the test mode of FIG. 7.
Figure 15:
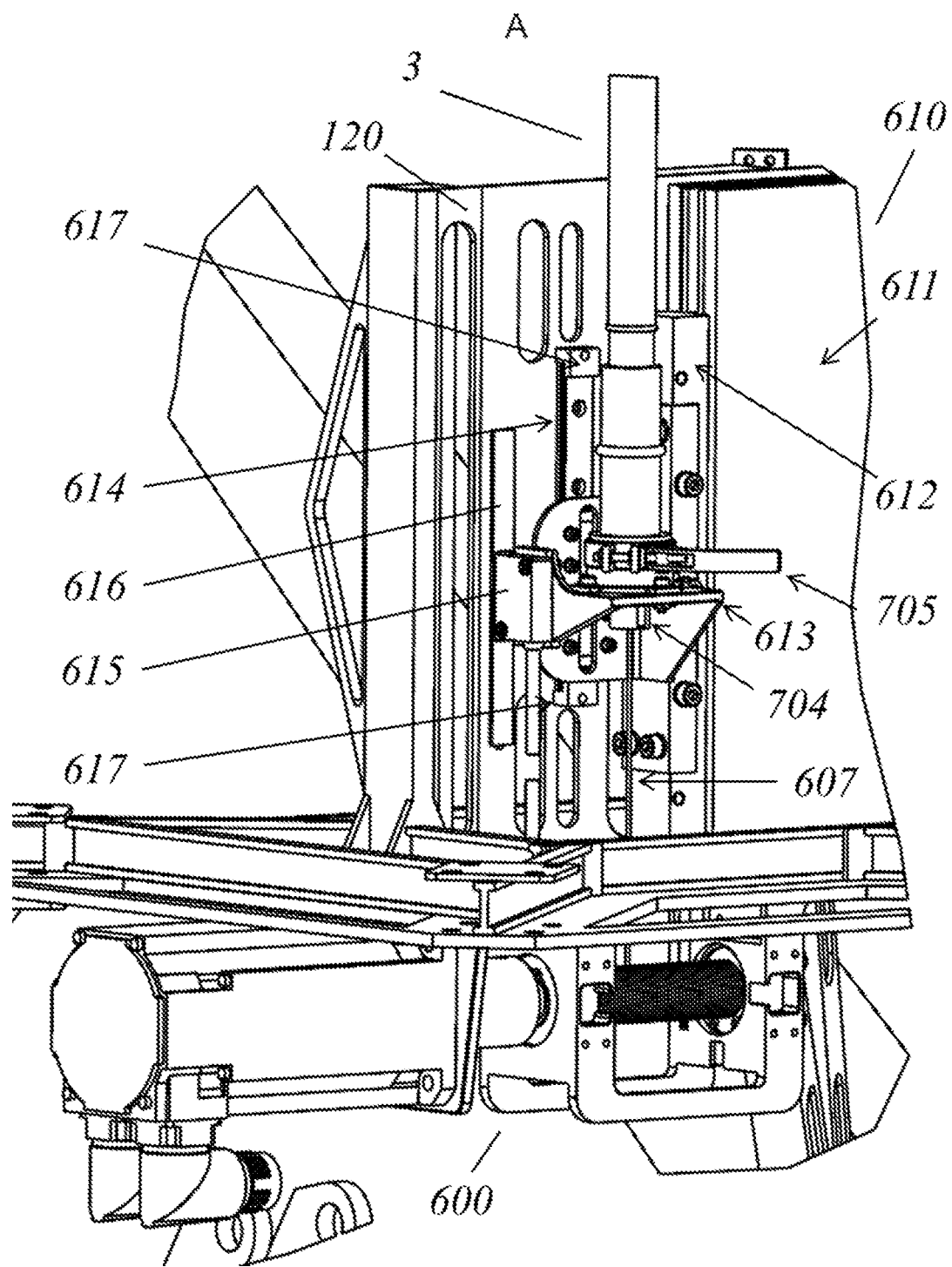
FIG. 15 shows the enlarged detail A from the perspective view in FIG. 11 depicting the actuators and the hybrid transmission.

With reference to the above mentioned section shown in FIG. 11, to the enlarged detail B, shown in FIG. 15, and to the relevant section view in FIG. 13, a first actuator unit 600 is associated to the main body 100, designed to determine the shortening and lengthening of the cable section 607 between the main body 100 and the load cell 507. This consists of a rotary servomotor 601 bound to the basic structure 110 by means of a flange 602. The above mentioned flange 602 consists of a plate for bolted connection to the basic structure 110 and a plate, orthogonal to the previous one, for bolted connection to the front surface of the rotary servomotor 601.

The servomotor output shaft 601 is connected to a drum 604. The drum 604 is bound to the bottom surface of the base structure 110 by a drum seat 606 that allows free rotation around its axis. In particular, the drum 604 can rotate around its own axis and with respect to the seat 606, as it is supported by rolling bearings. The seat 606 can be thought of as generated by the extrusion of a U-shaped flat profile. In correspondence with the horizontal portion of the wings of the U-shaped profile there are holes for the bolt connection of the seat 606 to the basic structure 110.

The connection between the servomotor output shaft 601 and the servomotor drum 604 is made by an elastic coupling 603. This elastic coupling 603 is suitably arranged to compensate the misalignment between the servomotor axis 601 and the drum axis 604, due to the different orientation of the respective supports due to the mounting by bolts to the basic structure 110.

The side surface of the drum 604 has grooves that follow the trajectory of a helix coaxial with respect to the axis of the drum 604; these grooves are suitably shaped to allow the cable 607 to be wound. At one end, the drum 604 has a flat surface, orthogonal to its axis, with at least one through hole with a diameter greater than the diameter of the cable 607, so that a free end of the cable 607 can be inserted into said hole and then tie it to a terminal 608, completely similar to the terminal 609, with said terminal 608 having a minimum diameter greater than said hole drilled in the drum 604.

The orientation of the flange 602 with respect to the basic structure 110 is such that the axis of the drum 604 is contained in a plane parallel to the transverse plane of the pantograph P, and away from it by half the average winding diameter of the cable 607, so that said cable 607 during winding and unwinding with respect to the drum 604 is always inside the transverse plane of the pantograph P.

FIGS. 14 to 19 show the apparatus 1 configured to operate in the second test mode, i.e. prepared for energizing of the pantograph Q mechanism, by means of a hybrid transmission 3.

The hybrid transmission 3 is obtained by connecting in series the first actuator group 600 and a second actuating unit 610 permanently associated to the main body 100 and connected to the torsion bar B of the pantograph P, to transmit vibratory movements to the latter.

Again with reference to FIG. 14 and the enlarged detail A, shown in FIG. 15, the support plate 120 is a reference element for mounting the second actuator assembly 610.

In this embodiment, the second actuating unit 610 consists of a component designed to generate a constant magnetic field, named as magnetic pathway 611, and an element, named coil 612. The magnetic pathway 611 takes the form of a parallelepiped whose height is predominant with respect to the base dimension; in particular, the thickness of said parallelepiped is about one tenth of its width. In the course of this document, we will define: i) frontal plane of the magnetic pathway 611, meaning the plane of symmetry of the parallelepiped envelope, which identifies the two greater dimensions, i.e. the height and the width; ii) lateral plane of the magnetic pathway 611, meaning the plane of symmetry of the parallelepiped envelope orthogonal to the frontal plane.

In this embodiment, the side surfaces parallel to the frontal plane are prepared for connection to the surface of the support plate 120. Again in the present embodiment, one of the two lateral surfaces parallel to the lateral plane has a rectangular profile opening, which extends for the entire height of the magnetic pathway 611 creating a cavity having thickness about half the thickness of its parallelepiped envelope. The magnetic pathway 611 has two permanent magnet tracks arranged on the two surfaces of the cavity parallel to the frontal plane and parallel to the longest edge of the parallelepiped. As a result of this bolted connection, these permanent magnet tracks are orthogonal to the horizontal plane of the base structure 110.

The coil 612 is equipped with a number of electric windings, designed to be driven by a control electric current. In the present embodiment, the coil 612 takes on a shape generated by a plate placed next to a parallelepiped. In particular, the thickness of the plate is less than the thickness of the cavity present in the magnetic path 611, so that said plate can be contained in said cavity. The lateral surfaces of the aforementioned parallelepiped are prepared for connection with a connection group 613.

The support plate 120 is equipped with a linear guide 614, bolted to the support plate 120 and arranged in such a way that the effective sliding direction of its slider is orthogonal to the horizontal plane of the base structure 110.

The connection group 613 consists of 4 portions. The first portion can be expected to be generated by extruding an L-profile; the lateral surfaces identified by the above mentioned L are provided with holes for the connection to the coil 612 by means of biting screws, so that, after the connection, the lateral surface orthogonal to the wing of shorter length, called frontal, is made parallel to the plate of the coil 612. We will call lateral the second surface identified by L. The second portion of the connection group 613 consists of a plate connected and orthogonal to the lateral surface of the connection group 613, parallel to its frontal surface and connected to the slider of the linear guide 614 by means of biting screws, so that, after the connection, the plate of the coil 612 is centred with respect to the gap in the magnetic pathway 611. The third portion of the connection group 613 consists of a plate orthogonal to the second portion and connected thereto on the opposite side with respect to the first portion; this third plate is also parallel to the lateral surface of connection group 613. The fourth portion of connection group 613 consists of a plate connected to the previous three portions of the connection group 613 and parallel to the plane within which the first portion of the connection group 613 assumes the L profile.

The third portion of the 613 connection group has holes for bolt connection to an encoder 615 designed to allow control of the second actuating unit 610. In this embodiment, the encoder 615 operates according to the Hall effect. It is crossed by currents that generate a magnetic field that interacts with the constant magnetic field generated by a track 616 of the encoder, which is bound to the support plate 120.

In relation to what has been described, it appears that, by supplying the coil 612 with a control current, the interaction between the induced magnetic field thus generated and the permanent magnetic field generated by the magnetic pathway 611 produces a motion effect of the connection group 613, which motion effect is purely translating along the direction of the line guide.

This translating motion is delimited by the presence of two limit switches 617, which are bound to the support plate 120.

Figure 18:
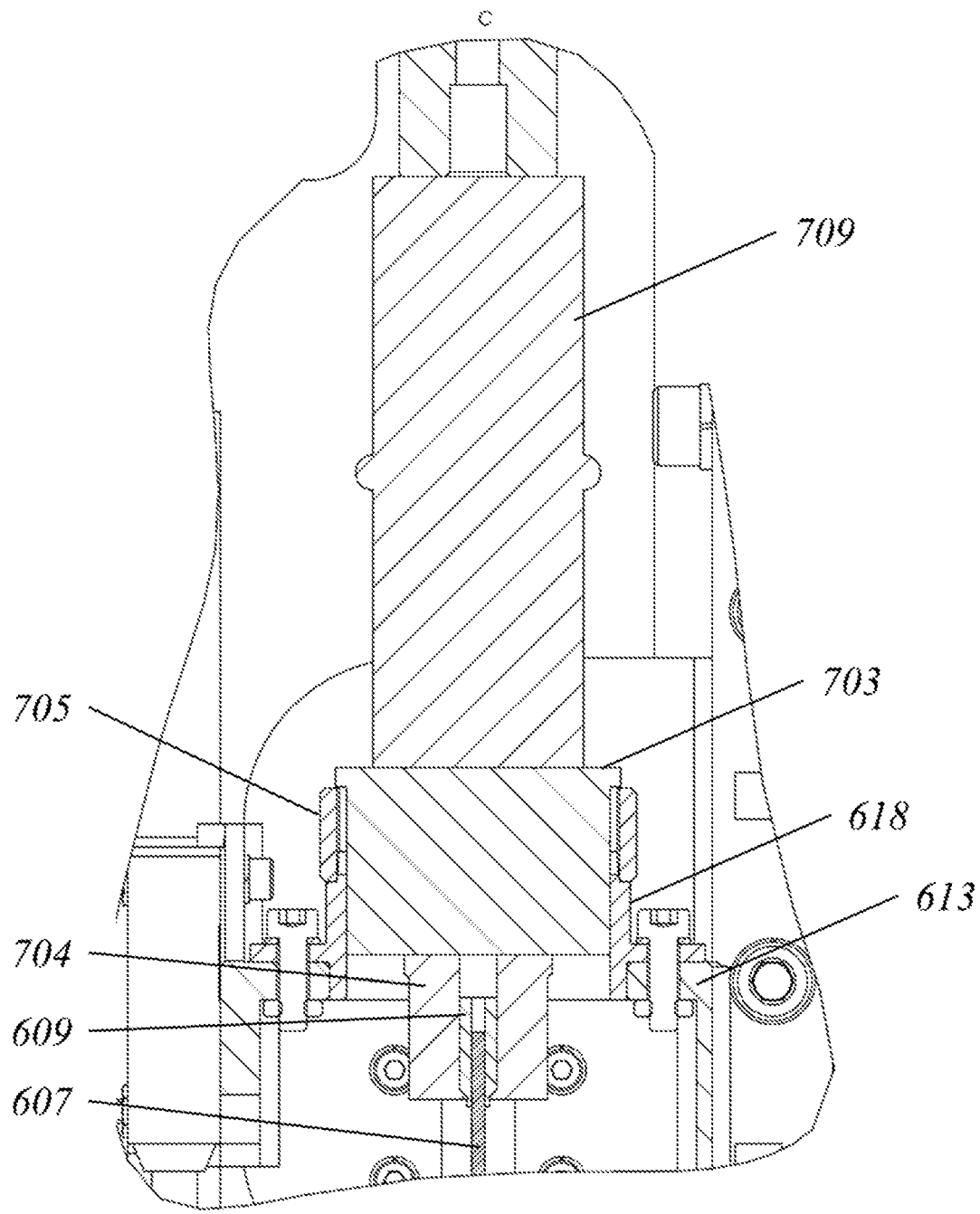
FIG. 18 shows the enlarged detail C from the section view of FIG. 17 depicting the interfaces for connection of the hybrid transmission to the linear servomotor.

As can be seen in FIG. 18, the fourth portion of connection group 613 is arranged for connection with a cylindrical guide ring 618 by means of bolts, so that, after the connection, the aforementioned ring 618 is placed in such position that its axis coincides with the axis of motion of the pantograph P mechanism Q.

Figure 14:
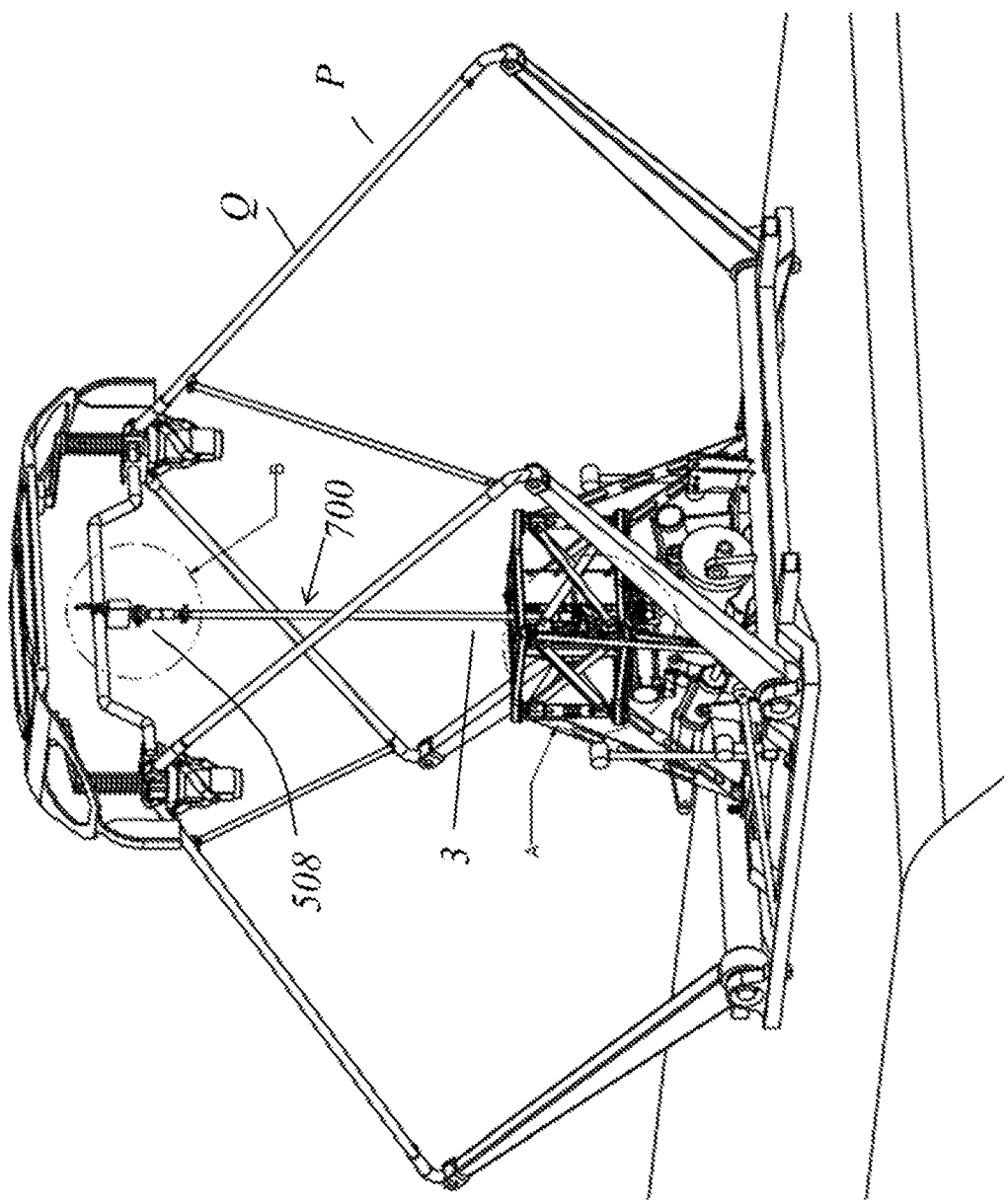
FIG. 14 shows a perspective view of the apparatus according to invention in the use configuration associated with the second test mode.
Figure 17:
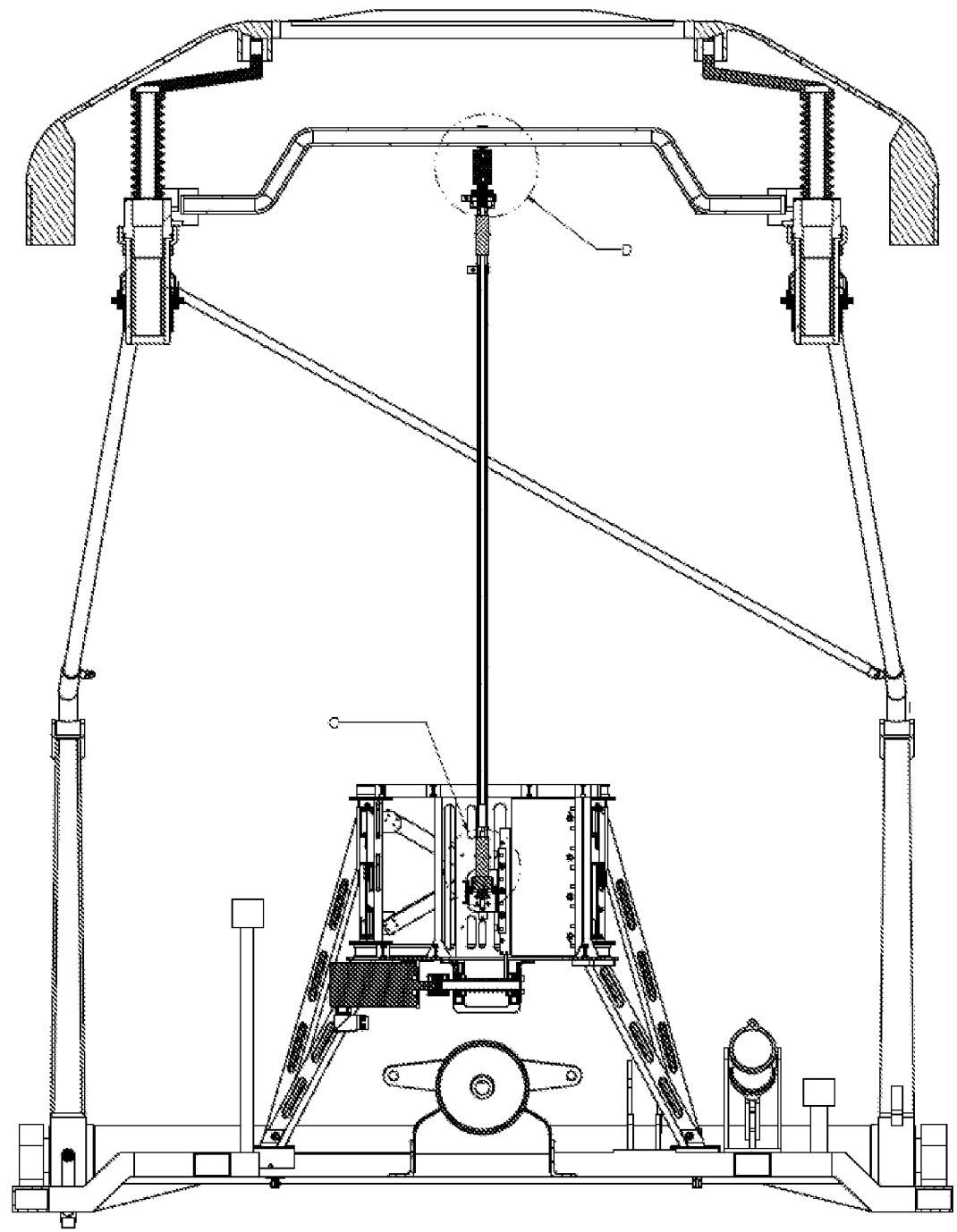
FIG. 17 shows a section view of the apparatus according to the invention in the use configuration shown in FIG. 14.

With reference to FIG. 14 and FIG. 17, a telescopic tube 700 is provided to connect the second actuator unit 610 with the load cell 507. The telescopic tube 700 is equipped with two opposite ends 706 and 703, which allow it to be mounted in the transmission chain designed to transfer the linear force generated on connection unit 613 to the pantograph P mechanism. With reference to FIG. 15 and FIG. 18, the telescopic tube 700 can be connected to the connection group 613 through the end 703. The aforementioned end 703 has a cylindrical shape with a nominal diameter equal to the nominal inner diameter of the guide ring 618. The connection of the telescopic tube 700 provides for an initial orientation imposed by the operator, who then attaches the end 703 inside the guide ring 618, so that the end 703 runs in the direction of the axis of the guide ring 618. The insertion motion stops when the flat, horizontal surface of the end 703 stops with the upper surface of guide ring 618.

The rigid connection between the end 703 and the guide ring 618 is made by means of a third quick coupling mechanism 705, similar to the second quick coupling mechanism 500. In particular, the command given by the lever with eccentric produces the tightening of the collar on the outer lateral surface of the corresponding guide ring, which tightening causes a distribution of the forces normal to the interface between the inner surface of the guide ring and the outer surface of the end 703. In the presence of friction, these normal forces also correspond to tangential reactions. The force system thus generated prevents relative motion between the two parts.

The 703 end is fitted with a coupling element 704, identical to the second coupling element 509 and therefore conformed for connection to the end of the cable 609. It follows that in this embodiment of the hybrid transmission 3, the force exerted by the cable 607 to ensure the static equilibrium of the pantograph mechanism Q is applied directly to the telescopic tube 700 and, by connection of its end 706, this force is applied to the torsion bar B of the pantograph. The coupling element 704 has a diameter smaller than the diameter of the end 703 of the telescopic tube, so that the coupling operation of the end 703 with respect to the guide ring 618 is carried out without interference. Thereafter, the terminal 608 of the cable 607 can be connected to coupling element 704.

Figure 16:
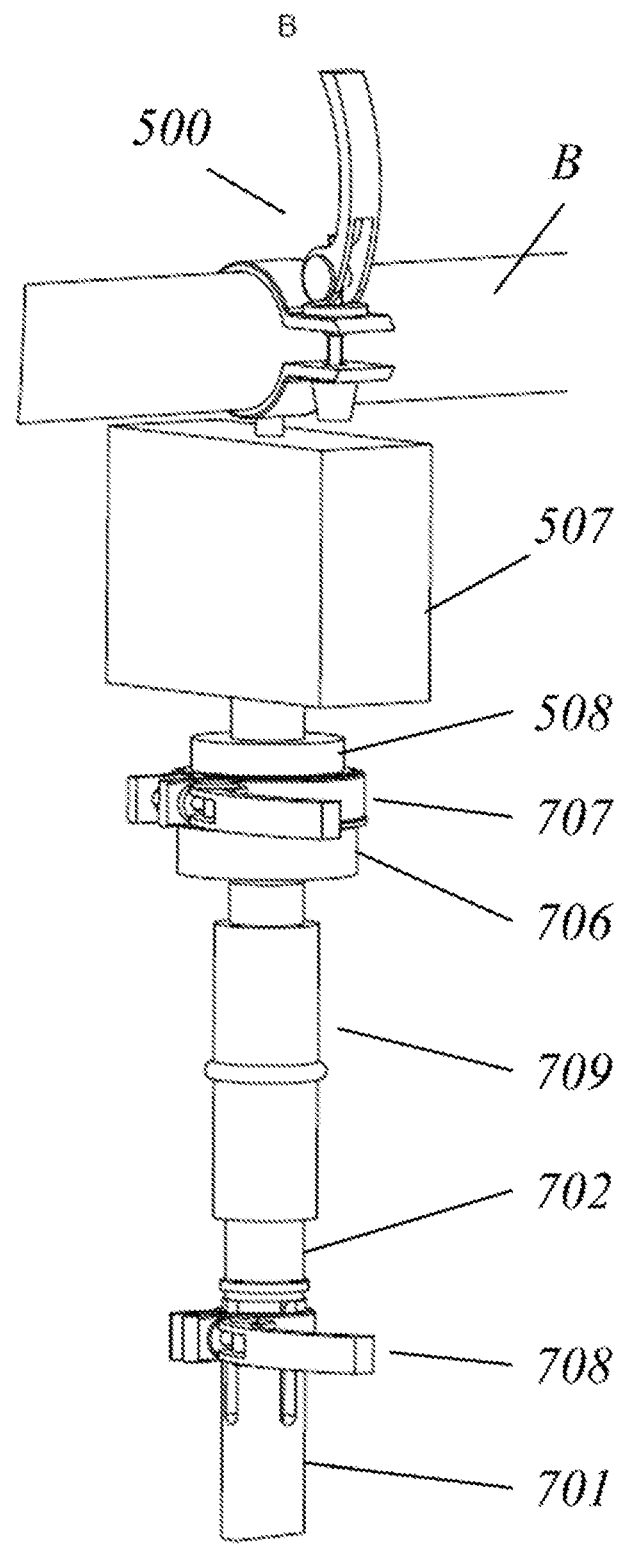
FIG. 16 shows the enlarged detail B from the perspective view of FIG. 14, depicting the interfaces for connection of the hybrid transmission to the load cell.
Figure 19:
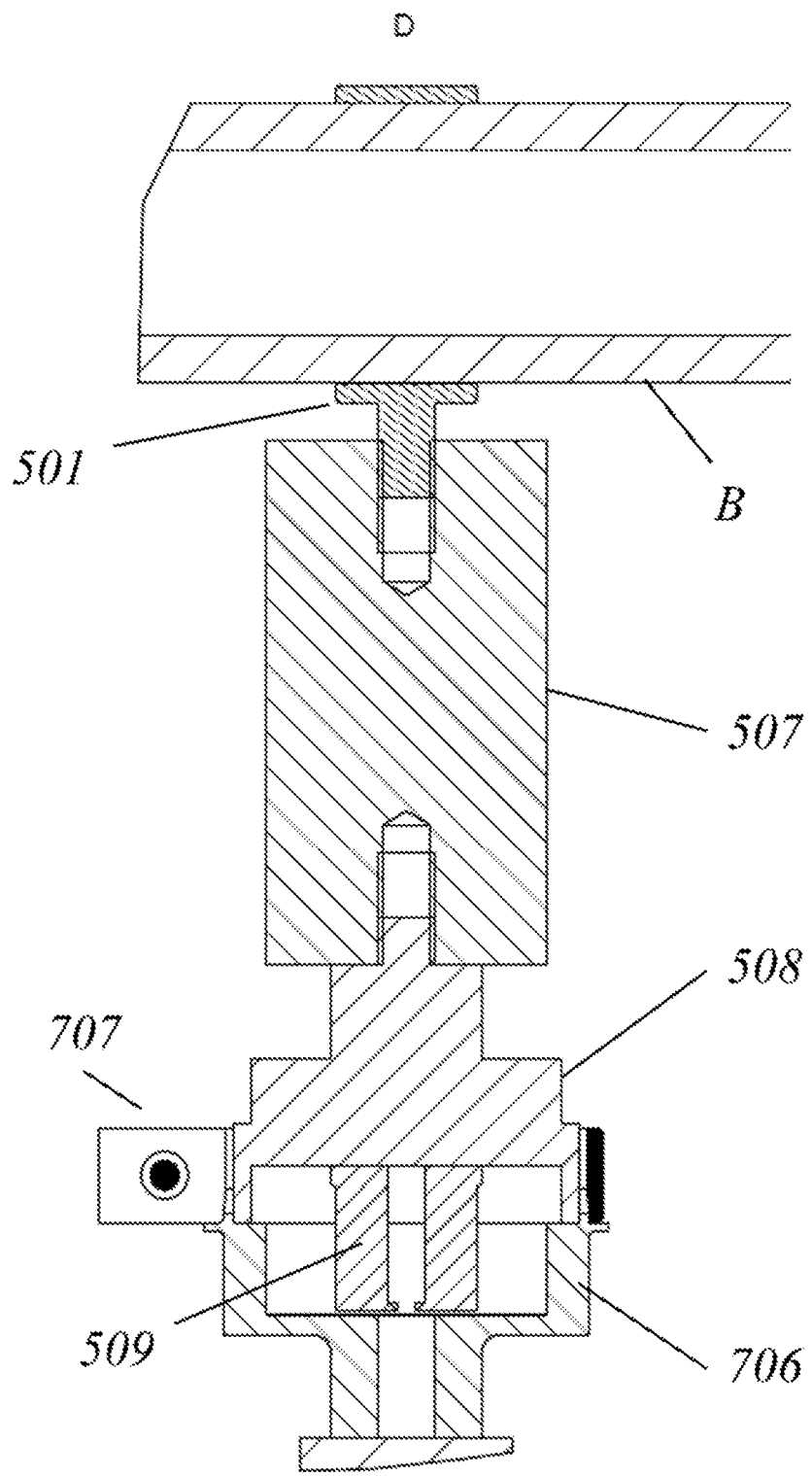
FIG. 19 shows the enlarged detail D from the sectional view of FIG. 14 showing the interfaces for connection of the hybrid transmission to the load cell.

With reference to FIG. 16 and FIG. 19 the telescopic tube 700 is equipped with a guide ring 706. The aforementioned guide ring 706 allows connection to the first coupling element 508 of the load cell 507. The guide ring 706 has a shape determined by two cylindrical surfaces, both hollow. The cylindrical surface with the largest diameter has a cavity whose nominal diameter coincides with the maximum nominal outer diameter of the first coupling element 508. The connection of the telescopic tube 700 requires a first orientation by the operator who inserts the guide ring 706 inside the first coupling element 508, so that the guide ring 706 slides with respect to the first coupling element 508, along the axial direction of the latter. The insertion motion stops when the flat horizontal surface of guide ring 706 reaches the bottom surface of the first coupling element 508.

The second cylindrical cavity of the guide ring 706 is so axially deep that there is no interference with the second coupling element 509 when the guide ring 706 is inserted in relation to the first coupling element 508. The rigid connection between the first coupling element 508 and guide ring 706 is made by means of a fourth quick-release coupling mechanism 707, which is similar to the third quick-release coupling mechanism 705.

In the present embodiment and with reference to FIG. 16, the telescopic tube 700 consists of two tubular elements 701 and 702, one of which is named outer tube 701 and has a hollow cylindrical shape that allows sliding of the element named inner tube 702 thereinside. The length of the telescopic tube 700 is determined by the reciprocal position along the common geometric axis of the two tubular elements 701 and 702. This length is determined by rigidly binding the two tubes by means of a fifth quick coupling mechanism 708, similar to the fourth quick coupling mechanism 707. In this embodiment, there is an inevitable misalignment between the axis of the first coupling element 508 and the axis of the cylindrical guide ring 618, actuated by the linear servomotor 610. Due to the mounting of the end 703 of the outer tube 701 to the cylindrical guide ring 618 and the mounting of the guide ring 706 to the end of the inner tube 702 to the first coupling element 508, this misalignment is reflected in a misalignment between the two tubular elements 701 and 702. To compensate for this misalignment, allowing the 700 tube to be mounted and the second actuator unit 610 to operate correctly, the axis of the outer tube 701 is disconnected from the axis of the end 703 and the axis of the inner tube 702 is disconnected from the axis of the guide ring 706, thanks to the presence of ball joints, 709. In this way, tubes 701 and 702 can slide with the same axis.

How to use an apparatus according to this invention as described above is described below.

In FIG. 7 the semi-automatic apparatus 1 is operating in the quasi-static test configuration. The above test is carried out following the following steps:
  the operator operates the pneumatic feeding of the pantograph drive Q, obtaining the lifting until the desired position is reached, avoiding contact with the catenary (using any necessary equipment);
  the operator installs the apparatus 1 with respect to the fixed frame of the pantograph T respecting the following assembly order:
    a. movement from above, along the vertical direction, of the apparatus 1 until the support surfaces of interfaces 201 are placed on the fixed frame T of the pantograph, observing that the apparatus 1 is so oriented with respect to pantograph P that the support plate 120 is parallel to the plane of transversal symmetry of pantograph P;
    b. coupling of apparatus 1 to the fixed frame T of the pantograph, following the installation of the first quick coupling mechanisms 400 and their tightening, obtained by means of the actuating means 300;
  the operator (using any equipment necessary to approach the installation point) binds the load cell 507 at the centre line of the torsion bar B of the pantograph, by means of the second quick coupling mechanism 500;
  the operator (using any equipment necessary to approach the installation point) hooks the terminal 609 of cable 607 to the second coupling element 509 (using any equipment necessary to approach the installation point);
  the operator supplies the equipment with electrical power, starts its operation via the user interface and controls the predisposition for operation in the test mode under examination;
  the angular position of the servomotor is recorded and assumed as the reference position;
  test execution;
  evaluation of the characteristic cycle and processing of the outcome about the overall functionality of the pantograph under examination by the processing unit;
  communication of the above outcome to the operator via a user interface.

At the end of the quasi-static test performed in the manner described above, the test continues with the execution of the dynamic test in accordance with the following steps:
  the operator removes the cable 607, obtaining the lifting of the mechanism Q of the pantograph, which is stopped using any auxiliary equipment and preparing the connection of the second actuating unit 610;
  the operator, using any necessary equipment, adjusts the height of the pantograph P, until the desired configuration for the dynamic test is reached, which is temporarily maintained in the presence of the thrust force, by means of any auxiliary equipment;
  the operator connects the telescopic tube 700 to the first coupling element 508 and to the connection group 613; more specifically, the operator: i) connects the end 703 of the outer tube 701 to the cylindrical guide ring 618, by means of the third quick coupling mechanism 705; connects the guide ring 706 of inner tube 702 to the first coupling element 508, by means of the fourth quick coupling mechanism 707; ii) adjusts the length of the telescopic tube 700, so that the coupling group 613 is at about half its stroke, limited by the limit switches 617; iii) provides a rigid connection between the two tubular elements 701 and 702 by tightening the fifth quick coupling mechanism 708;
  the operator hooks the cable 607 to the coupling element 704 of the telescopic tube 700;
  the operator attaches vibration sensors (not shown in the figures as they are of known technique) to the pantograph mechanism Q, applying them in predetermined points and orienting them appropriately;
  the operator prepares and/or verifies the connection and communication between the vibration sensors and the central processing unit;
  the operator starts the operation of the equipment through the user interface and controls the predisposition for operation in the test mode under examination; the position of the first actuating unit 600 is recorded and taken as a reference position to evaluation the height position of the torsion bar B of the pantograph;
  the operator removes the equipment used to maintain the test configuration during the set-up phase of the equipment;
  performing the dynamic test;
  at the end of the test, the processing unit evaluates the dynamic properties of the pantograph in the selected configuration from the data acquired by the sensor. Subsequently, it elaborates a report about the overall status of the pantograph and possibly providing a description of the anomalies found, indicating possible origin and entity;
  communication of this report to the operator through a user interface;
  the operator disconnects the pantograph mechanism from the telescopic tube;
  the operator shall ensure that steps 9 to 19 are repeated at different height positions of the pantograph torsion bar B at different heights;

the operator uninstalls the device 1 and pneumatically disconnects the pantograph P and closes it.

What has been expressed above in relation to the structural characteristics of the various components of the apparatus of the invention as well as in relation to the relative modes of operation is purely illustrative and not exhaustive and the advantages of the apparatus of the invention highlighted above certainly remain safeguarded in the presence of variations or modifications of a practical applicative nature, while always remaining within the scope of protection defined by the following claims.

The invention claimed is:

1. An apparatus for the inspection of railway pantographs, comprising:
    a mechanical structure including a main body and connecting structures suitable for detachably connecting the main body with a fixed frame of a railway pantograph; and
    a hybrid transmission, comprising:
        at least one flexible and substantially inextensible connecting element associated at one end with the main body and detachably associated at a second end, in a first operational configuration of the apparatus, with a mechanism of the pantograph;
        rigid transmission elements suitable to be connected, in a second operational configuration of the apparatus, on the one end to the main body and to the second end of the flexible connecting elements and on the second end to the mechanism;
        a first actuating unit arranged to exert a direct tractive force on the flexible and substantially inextensible connecting element in a direction of the only degree of freedom of the pantograph mechanism and in such a direction as to oppose the lifting of the mechanism itself, so determining the height position of the mechanism; and
        a second actuating unit arranged to impose an alternating vibratory movement in the direction of the only degree of freedom of the pantograph mechanism on the rigid transmission elements;
    wherein, in the first operational configuration, the pantograph mechanism is subject to a traction action of the flexible connecting element determining its height position, wherein, in the second operational configuration, the pantograph mechanism is subject simultaneously to the traction action of the flexible connecting element determining its height position and to the action of the rigid connecting elements transferring to it the alternating vibratory movement of the second actuating unit.

2. The apparatus according to claim 1, further comprising force sensors, position sensors or vibration sensors.

3. The apparatus according to claim 1, further comprising electronic peripherals for data acquisition, data processing and communication between at least one other apparatus.

4. The apparatus according to claim 1, further comprising a processing unit configured to process the data of the sensors to perform a diagnosis of the pantograph.

5. The apparatus according to claim 1, further comprising human-machine interfaces for the control and management of a maintenance procedure and for reading and historicization of results.

6. The apparatus according to claim 1, wherein the flexible connecting element or cable, is connected at one end to the mechanism of the pantograph by means of a second quick coupling mechanism and is guided by a drum to which it is bound at the second end, wherein the drum is integral to an output shaft of a rotary servomotor of the first actuating elements.

7. The apparatus according to claim 1, further comprising at least one mono axial load cell, that is bound so as to measure the tension in a cable and at least one angular position sensor, attached to an output shaft of a servomotor, through which it is possible to obtain an indirect evaluation of the height position of the mechanism of the pantograph.

8. The apparatus according to claim 1, further comprising a processing unit configured to automatically execute a planned control strategy that imposes a uniform motion condition of the pantograph mechanism by driving a rotary servomotor to adjust the torque intensity applied to a drum and, consequently, the tension at the ends of a cable.

9. The apparatus according to claim 1, further comprising a load cell mounted so as to measure the force applied by the hybrid transmission to the mechanism of the pantograph, the output signals of a load cell being opportunely acquired by a processing unit and processed to control a spectral shape of a dynamic force applied to the mechanism of the pantograph.

10. The apparatus according to claim 1, wherein the apparatus is configured for the simultaneous use of two actuating units connected to the pantograph by means of the hybrid transmission and comprises:
    rigid transmission elements controlled by the second actuating unit, the rigid transmission elements being designed to compensate a misalignment between an axis of the mechanism of the pantograph and an actuated axis of the second actuating unit; and
    a flexible transmission comprising a rotary servo motor, a drum and a flexible element, the rotary motor being designed to generate a static driving torque, the drum being so bound as to be integral to an output shaft of the rotary servo motor and with one end of the flexible element being bound to the drum.

11. The apparatus according to claim 1, wherein the second actuating unit is sized and controlled to generate a dynamic forcing force in a frequency range of 0-20 Hz.

12. The apparatus according to claim 1, wherein the rigid transmission elements have an adjustable length, so that dynamic forces generated by the second actuating unit can be applied to the mechanism of the pantograph in different positions in its height.

13. The apparatus according to claim 1, wherein the mechanical structure and first quick coupling mechanisms for the connection to the fixed frame of the pantograph are so dimensioned such that the first vibrational frequency of the mechanical structure coupled to the fixed frame of the pantograph is at least one order of magnitude higher than a band of frequencies excitable by the hybrid transmission.

14. The apparatus according to claim 1, wherein the mechanical structure includes structural elements so connected to each other so as to form a three-dimensional framework.

* * * * *